United States Patent
Yamamoto et al.

(10) Patent No.: US 10,909,154 B2
(45) Date of Patent: Feb. 2, 2021

(54) SEARCH SYSTEM, SEARCH METHOD AND SEARCH PROGRAM

(71) Applicant: NEC Corporation, Tokyo (JP)

(72) Inventors: Kosuke Yamamoto, Tokyo (JP); Takao Shime, Tokyo (JP); Hironori Mizuguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 15/558,112

(22) PCT Filed: Mar. 10, 2016

(86) PCT No.: PCT/JP2016/001341
§ 371 (c)(1),
(2) Date: Sep. 13, 2017

(87) PCT Pub. No.: WO2016/147624
PCT Pub. Date: Sep. 22, 2016

(65) Prior Publication Data
US 2018/0046706 A1    Feb. 15, 2018

Related U.S. Application Data

(60) Provisional application No. 62/132,648, filed on Mar. 13, 2015.

(51) Int. Cl.
*G06F 16/33* (2019.01)
*G06F 16/35* (2019.01)
(Continued)

(52) U.S. Cl.
CPC ........ *G06F 16/3344* (2019.01); *G06F 16/338* (2019.01); *G06F 16/35* (2019.01);
(Continued)

(58) Field of Classification Search
None
See application file for complete search history.

(56) References Cited

U.S. PATENT DOCUMENTS

2007/0106627 A1* 5/2007 Srivastava ............ G06Q 10/10
                                                                 706/20
2015/0286698 A1* 10/2015 Gagnier ................ G06F 16/284
                                                                 707/736

FOREIGN PATENT DOCUMENTS

JP    9-101990    4/1997
JP    9-223161    8/1997
(Continued)

OTHER PUBLICATIONS

International Search Report dated Jun. 7, 2016, in corresponding PCT International Application.
(Continued)

*Primary Examiner* — Amresh Singh
(74) *Attorney, Agent, or Firm* — Finnegan, Henderson, Farabow, Garrett & Dunner, L.L.P.

(57) ABSTRACT

A search system includes a reception unit 601 for receiving specification of a specific sentence in an article, a search unit 602 using a first sentence being the specified sentence as a search query to search an article including a sentence having a meaning similar to the connotations of the first sentence, and a display unit 603 for displaying information of the searched article as a related article to the first sentence, and when there are a plurality of related articles, the display unit 603 preferentially displays the related articles in descending order of difference relative to a first article being the article including the first sentence.

9 Claims, 16 Drawing Sheets

(51) Int. Cl.
*G06F 16/338* (2019.01)
*G06F 40/30* (2020.01)
*G06F 40/134* (2020.01)
*G06F 40/169* (2020.01)

(52) U.S. Cl.
CPC .......... *G06F 40/134* (2020.01); *G06F 40/169* (2020.01); *G06F 40/30* (2020.01)

(56) References Cited

FOREIGN PATENT DOCUMENTS

| | | |
|---|---|---|
| JP | 2000-105769 | 4/2000 |
| JP | 2004-318528 | 11/2004 |
| JP | 2005-258831 | 9/2005 |
| JP | 2008-77252 | 4/2008 |
| JP | 2011-22630 | 2/2011 |
| JP | 5494999 | 5/2014 |

OTHER PUBLICATIONS

Tsuchida et al.; "IKOMA at TAC2011: A Method for Recognizing Textual Entailment Using Lexical-Level and Sentence Structure-Level Features", URL:http://www.nist.gov/tac/publications/2011/participant.papers/IKOMA.proceedings.pdf, 5 sheets, (2011).

\* cited by examiner

FIG. 1

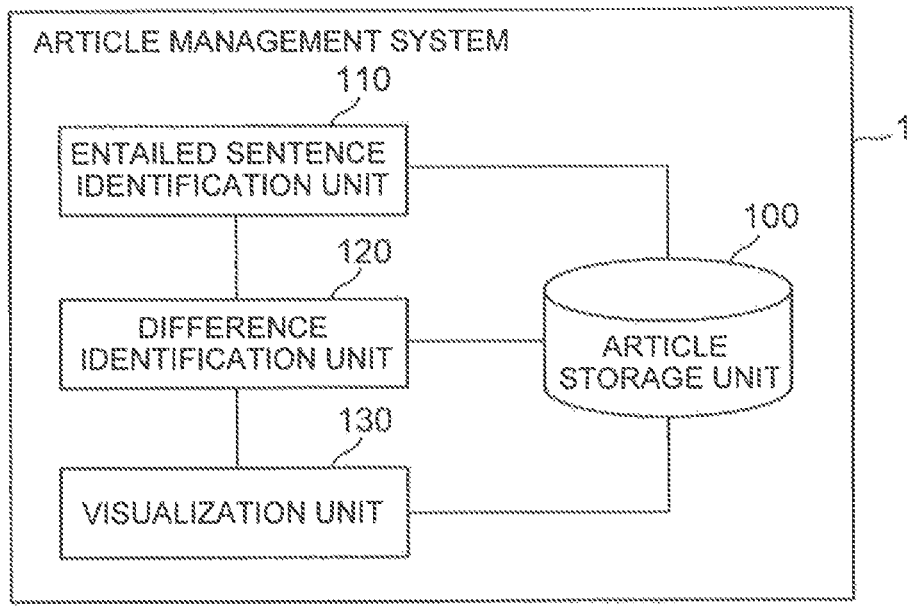

FIG. 2

| ARTICLE ID | SENTENCE ID | TEXT |
|---|---|---|
| 1 | 1 | BIG EXPLOSION ACCIDENT IN COUNTRY A, 56 PEOPLE KILLED. |
| | 2 | Big explosion accident happened in Z distinct in country A, on the 21st, and over 50 people were killed. |
| | 3 | Accident happened at W near X tower, in Y city in the northeast of country Z, at night on the 21st. |
| | ⋮ | ⋮ |
| 2 | 1 | Seventy-three people killed in explosion accident in country A, the third accident this year. |
| | 2 | Big explosion accident happened in the capital V in the country, on the 5th, and at least 73 people were killed. |
| | 3 | Police of country A investigating incident or accident. |
| | ⋮ | ⋮ |
| ⋮ | ⋮ | ⋮ |

FIG. 3

| TARGET SENTENCE | | ENTAILED SENTENCE | |
|---|---|---|---|
| ARTICLE ID | SENTENCE ID | ARTICLE ID | SENTENCE ID |
| 1 | 1 | 2 | 2 |
| 1 | 1 | 12 | 1 |
| 2 | 2 | 12 | 1 |
| : | : | : | : |
| 4 | 8 | 8 | 5 |
| 8 | 5 | 23 | 3 |
| 23 | 3 | 4 | 8 |
| : | : | : | : |

FIG. 4

| CLUSTER ID | ARTICLE ID | SENTENCE ID | REPRESENTATIVE SENTENCE FLAG | TEXT |
|---|---|---|---|---|
| 1 | 1 | 1 | True | BIG EXPLOSION ACCIDENT IN COUNTRY A, 56 PEOPLE KILLED. |
| | 2 | 2 | | Big explosion accident happened in the capital V in the country, on the 5th, and at least 73 people were killed. |
| | 12 | 1 | | Continuous explosion accident in country A? Fifty people killed. |
| | 3 | 3 | | Explosions which seem to be accidents occur one after another in country A, 50 people were killed so far, and anxiety grows among people. |
| | ... | ... | | ... |
| 2 | 4 | 8 | True | Country B announced support for country A. |
| | 8 | 5 | | Mr. C expressed appreciation for support from country B. |
| | 23 | 3 | | The D congress is established for the investigation of the serial accidents and the development of international safety standards, and expectations are running high as country B expressing support for country A also participates in this congress. |
| | ... | ... | | ... |
| ... | ... | ... | | ... |

FIG. 7

| ARTICLE | |
|---|---|
| ID: | 201311-7205-2_3_12 |
| CONTENTS: | << BIG EXPLOSION ACCIDENT IN COUNTRY A, 50 PEOPLE KILLED [5] >> Explosions which seem to be accidents occur one after another in country A. 50 people were killed so far, and anxiety grows among people [5]. The police of country A says several M machines exploded during operation in the capital V, on the 20th, and 50 people were killed and 140 people were injured, so far. Explosion occurs in Z district, and the police is now investigating the incident or accident. In country A, similar serial explosions occurred in this year, and draws global attention [22]. |

FIG. 19

| ARTICLE ID | SENTENCE ID | TEXT |
|---|---|---|
| A | 1 | TOKYO WAS SELECTED TO HOST THE OLYMPICS AND PARALYMPICS. |
| A | 2 | According to the report of X company, economic effect of approximately 30 trillion yen can be expected. |
| A | 3 | However, it is a problem to raise funds for a budget of approximately several trillion yen. |
| A | ⋮ | ⋮ |
| B | 1 | THE OLYMPICS WILL BE HELD IN TOKYO |
| B | 2 | X company report says there is an economic effect of 30 trillion yen. |
| B | 3 | In particular, the increase in environmental demand will be expected. |
| B | 4 | Multilingual service is the major challenge for the tourism industry, for the Tokyo Olympic Games. |
| B | ⋮ | ⋮ |
| C | 1 | TOKYO OLYMPIC GAMES WILL BE HELD. |
| C | 2 | Economic effect from the Olympics will be expected. |
| D | 1 | The Tokyo Olympic Games will be held overcoming disadvantageous situations. |
| D | 2 | Half a century passed since the first Tokyo Olympic Games. |
| D | 3 | Let's look back at the Tokyo Olympic Games in 1964. |
| D | ⋮ | ⋮ |

SEARCH SYSTEM, SEARCH METHOD AND SEARCH PROGRAM

CROSS-REFERENCE TO RELATED PATENT APPLICATIONS

This application is a National Stage Entry of International Application No. PCT/JP2016/001341, filed Mar. 10, 2016, which claims the benefit of priority from U.S. Provisional Patent Application No. 62/132,648, filed Mar. 13, 2015. The entire contents of the above-referenced applications are expressly incorporated herein by reference.

TECHNICAL FIELD

The present invention relates to a search system, a search method, and a search program for searching an article.

BACKGROUND ART

There is textual entailment as one of the processes of determining similarity between meanings of sentences. An example of the textual entailment is described in NPL 1. An example of grouping texts on the basis of the textual entailment is described in PTL 1.

The textual entailment is a process for determining the presence or absence of a relationship "A entails B", where "A" and "B" are each a sentence or a unit of written expression corresponding to a sentence (hereinafter referred to as "sentence" to represent both of them). Furthermore, determination of the presence or absence of such a relationship may be referred to as entailment determination.

Here, "A entails B" represents that if A is true, B is also true. In addition, as described in PTL 1, when the meaning of B can be read from the expression of A, it may be defined that A entails B. Hereinafter, a relationship in which a first sentence entails another sentence is sometimes referred to as an entailment relationship.

Furthermore, there is also a search system for specifying a sentence for a search query, in such a search system, a sentence specified for the search query is subjected to morphological analysis, a word included in a specified sentence is extracted, and a sentence or an article is searched by using the extracted word as a search query.

CITATION LIST

Patent Literature

PTL 1: Japanese Patent No. 5494999

Non Patent Literature

NPL 1: Masaaki Tsuchida, Kai Ishikawa, "IKOMA at TAC2011: A Method for Recognizing Textual Entailment Using Lexical-level and Sentence Structure-level features", [online], [retrieved on Jan. 26, 2016], Internet <URL: http://www.nist.gov/tac/publications/2011/participant.papers/IKOMA.proceedings.pdf>

SUMMARY OF INVENTION

Technical Problem

Incidentally, it is assumed that when reading an article, a reader is interested in partial contents of the article. Hereinafter, from among a plurality of contents of the article, a content of interest to the reader is described as "viewpoint". In order to obtain more information about the viewpoint the reader sometimes desires to read other articles containing new contents about that viewpoint, not represented in the article he/she is reading now. Furthermore, the reader sometimes further desires to read other articles written about a matter relating to that viewpoint (e.g., peripheral matters, such as matters often discussed with the matter).

However, in a search system using morphological analysis, such an article is not always searched. For example, even when the user specifies a sentence expressing a viewpoint of interest to the user, there is a possibility that an article is searched including a sentence similar to the specified sentence but containing no new content. As an example, there is a possibility that articles having exactly the same contents are searched although publishing places are different. Furthermore, for example, an article may be searched which uses words or characteristic words used in a specified sentence, but represents a content completely different from a content represented by a sentence specified in an original article in other words, a content completely different from a viewpoint of interest to the user. In an example, when a sentence expressing "an X model has high performance and low price" is specified, an article including a sentence expressing "a Y model has higher performance than that of the X model" or "the X model has high price" may be searched.

As described above, the search system using morphological analysis has a problem that information relating to a partial content in an article as a content of interest to the reader (i.e., viewpoint) cannot be efficiently collected.

Therefore, it is an object of the present invention to provide a search system, a search method, and a search program which allow a user to efficiently collect information relating to a partial content in an article as a specific viewpoint.

Solution to Problem

A search system according to the present invention includes a reception unit for receiving specification of a specific sentence in an article, a search unit using a first sentence being a specified sentence as a search query to search an article including a sentence having a meaning similar to the connotations of the first sentence, and a display unit for displaying information of the searched article as a related article to the first sentence, in which when there are a plurality of related articles, the display unit preferentially displays the articles in descending order of difference relative to a first article being an article including the first sentence.

Further, a search method according to the present invention includes receiving specification of a specific sentence in an article, using a first sentence being a specified sentence in a search query to search an article including a sentence having a meaning similar to the connotations of the first sentence, and displaying information of a searched article as a related article to the first sentence, in which when there are a plurality of related articles, the articles are preferentially displayed in descending order of difference relative to a first article being an article including the first sentence, for display.

Furthermore, a search program according to the present invention causes a computer to execute a process including receiving specification of a specific sentence in an article, using a first sentence being a specified sentence in a search query to search an article including a sentence having a meaning similar to the connotations of the first sentence, and displaying information of the searched article as a related article to the first sentence, in which in the process of displaying, when there are a plurality of related articles, the articles are preferentially displayed in descending order of difference relative to a first article being an article including the first sentence.

According to the present invention, the user can efficiently collect information relating to a partial content in an article as a specific viewpoint.

BRIEF DESCRIPTION OF DRAWINGS

FIG. 1 It depicts an exemplary block diagram illustrating an article management system according to a first exemplary embodiment.

FIG. 2 It depicts a table illustrating an example of articles stored in an article storage unit 100.

FIG. 3 It depicts a table illustrating an example of information output from an entailed sentence identification unit 110.

FIG. 4 It depicts a table illustrating an example of information output from the entailed sentence identification unit 110.

FIG. 7 It depicts an explanatory view illustrating an example of display by a visualization unit 130.

FIG. 19 It depicts a table illustrating another example of a sentence set.

DESCRIPTION OF EMBODIMENTS

Figure 5:
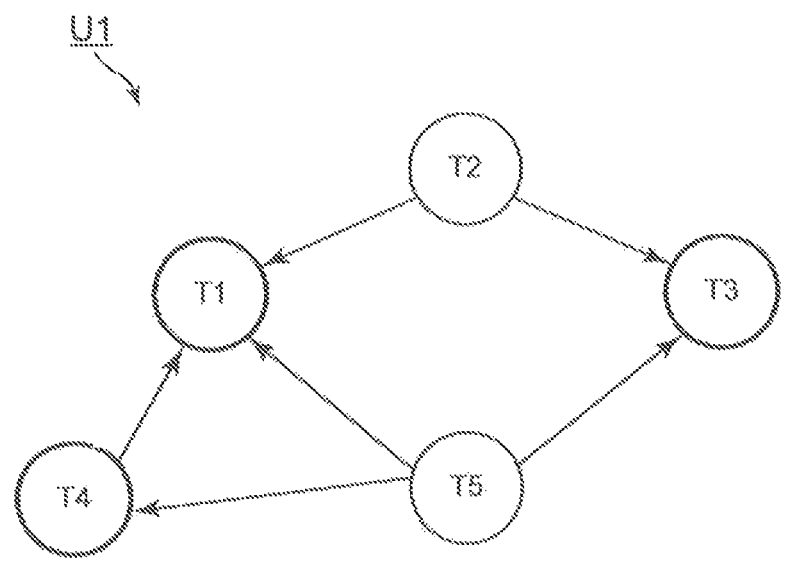
FIG. 5 It depicts an explanatory diagram illustrating an example of an entailment relationship in a sentence set U1.

First, terms used in the present invention will be described. In the present invention, "article" represents a text showing a specific content. Incidentally, the article may be read as a file having at least a text recorded, in such a configuration, the article may include information other than the text, such as an image.

In addition, "sentence" generally represents a character string which ends with a period. However, in each of exemplary embodiments, "sentence" can include, for example, a series of character strings not ending with a period, such as a title, or a character string corresponding to a sentence obtained after division of a character string, such as "a is b, but c is d.", connected with a predetermined conjunction or the like and dividable into two or more sentences. In addition, in each exemplary embodiment, "sentence" can include not only a character string corresponding to a sentence as described above, but also a character string, such as a clause, forming a unit of certain written expression from which a specific meaning can be read when a person reads the written expression.

Furthermore, "meaning" of a sentence represents an explicit meaning of the sentence, that is, a matter expressed by the sentence itself such as the meanings of a word included in the sentence or a matter obtained by pure analysis of grammatical usage. In contrast, "connotations" of a sentence represents not only a matter expressed by a sentence itself but also all the meanings which a person can recognize from the sentence, such as a matter expressed by part of the sentence or an implied meaning of the sentence. That is, the connotation corresponds to part or all of a range including an explicit meaning and an implied meaning of a sentence. Of course, one of "connotations" of a sentence includes the "meaning" of the sentence.

Exemplary Embodiment 1

FIG. 1 is an exemplary block diagram illustrating an article management system according to a first exemplary embodiment of the present invention. In the first exemplary embodiment, the article management system 1 includes an article storage unit 100, an entailed sentence identification unit 110, a difference identification unit 120, and a visualization unit 130.

The article storage unit 100 stores articles. In the present exemplary embodiment, a sentence in tin article and an article having information relating thereto are associated with each other, and the article storage unit 100 stores two or more articles to be subjected to such association.

In addition, in the article storage unit 100, an article ID is assigned, as an identifier, to each article to identify the article, and further to each sentence in each article, a sentence 10 is assigned as an identifier to identify the sentence.

FIG. 2 is a table illustrating an example of articles stored in the article storage unit 100. As illustrated in FIG. 2, instead of storing an article set to be subjected to association, the article storage unit 100 may store a sentence set obtained by dividing each article to be subjected to association into sentences. Such a sentence set is obtained, for example, by splitting each article to be subjected to association, into sentences (sentence segmentation process). In a sentence set, an identifier is assigned to each sentence, for identification of an article including the sentence, as one of information for identifying the sentence. In the example illustrated in FIG. 2, each sentence constituting an article to be subjected to association is stored in association with an article ID for identifying an article including the sentence, and a sentence ID for identifying the sentence in the article. Note that the article storage unit 100 may store an article set to be subjected to association, and a sentence set obtained by dividing each of articles to be subjected to association, into sentences.

The entailed sentence identification unit 110 identifies another sentence having an entailment relationship with each sentence included in a first sentence set being a set of sentences stored in the article storage unit 100, on the basis of the textual entailment, to identify another sentence having a meaning similar to any of the connotations of each sentence. Here, "similar" is a concept including "identical". Note that another sentence (e.g., sentence B) having an entailment relationship with a sentence A includes not only the sentence B where the sentence B entails the sentence A, but also the sentence B where the sentence A entails the sentence B.

For example, the entailed sentence identification unit 110 may define that (1) when the sentence B entails the sentence A, the meaning of the sentence B is similar to any of connotations of the sentence A. More specifically, at this time, the entailed sentence identification unit 110 may define that the meaning of the sentence B is similar to any connotation of the sentence A. Furthermore, for example, the entailed sentence identification unit 110 may define that (2) when the sentence A entails the sentence B, the meaning of the sentence B is similar to any of the connotations of the sentence A. More specifically, at this time, the entailed sentence identification unit 110 may define that the sentence A has all the connotations of the sentence B, and the meaning of the sentence B is similar to some of the connotations (only connotations common to those of the sentence B) of the sentence A. In this configuration, "the meaning of the sentence is similar" represents that the sentence has the same meaning as any of the connotations of an opponent sentence, or has a restricted meaning of any of the connotations of the opponent sentence. In the above example, (1) corresponds to the restricted meaning of any of the connotations of the opponent sentence, and (2) corresponds to the same meaning as any of the connotations of the opponent sentence.

For example, the entailed sentence identification unit 110 may sequentially read sentences from the first sentence set and compare each of the read sentences with the other sentences of the first sentence set to perform entailment determination. At this time, when objects to be compared with each other are sentences in the same article, the entailed sentence identification unit 110 may not perform the entailment determination.

Furthermore, for example, the entailed sentence identification unit 110 may perform clustering on the first sentence set on the basis of textual entailment (hereinafter referred to as entailment clustering). At this time, when a cluster is generated including sentences in the same article, the entailed sentence identification unit 110 may treat the sentences in the same article as not being in an entailment relationship in the same cluster. For example, even when a sentence A and a sentence B belong to the same cluster, it may be considered that there is no entailment relationship between the sentence A and the sentence B which are included in the same article.

A method of entailment clustering is not particularly limited. For example, the method described in PTL 1, which is described above, may be employed. Furthermore, for example, a method may be employed in which each sentence included in a sentence set including sentences constituting all target articles is used as a representative sentence so that the representative sentence and another sentence entailing the representative sentence are members in the same cluster.

In this configuration, the same number of clusters as the number of sentences are generated. As the method of entailment clustering, a method of multi-stage clustering can be employed in which clusters are further merged on the basis of the degree of overlapping of elements between clusters obtained by one-stage clustering as described above.

FIGS. 3 and 4 are tables illustrating examples of information output from the entailed sentence identification unit 110. Note that FIG. 3 illustrates an example of information representing a result of entailment determination performed by the entailed sentence identification unit 110. In FIG. 3, a target sentence represents a sentence to be determined whether to have an entailment relationship with another sentence. Furthermore, the entailed sentence represents a sentence determined to entail a target sentence. For example, with reference to FIG. 3, a sentence 1-1 is determined to entail a sentence 2-2. Hereinafter, when expression "sentence n-m" is used as expression for identifying a sentence, on the right side of "-" indicates information (article ID) for identifying an article, and "m" on the left side indicates information (sentence ID) for identifying the sentence.

FIG. 4 illustrates an example of information representing a result of entailment clustering performed by the entailed sentence identification unit 110. In FIG. 4, a cluster ID indicates an identifier of a cluster classified by entailment clustering. Furthermore, a set of an article ID and a sentence ID indicates a set of an article ID and a sentence ID of a sentence belonging to the relevant cluster. Furthermore, a representative sentence flag represents a representative sentence of the relevant cluster. In general, for a representative sentence of each cluster, a sentence is selected to have an entailment relationship with the most other sentences included in a cluster to which the representative sentence belongs. For example, as an example of the entailment relationship between a representative sentence and another sentence in the same cluster, there is a relationship in which all the other sentences in the same cluster entail a representative sentence. Note that this relationship does not deny a relationship in which a representative sentence entails another sentence in the same cluster.

Depending on the method of entailment clustering, the relationship in which all the other sentences in the same cluster entail a representative sentence may not be established. For example, as a result of multi-stage clustering, the other sentences other than the representative sentence may not entail the representative sentence, in a finally generated cluster. Note that even when there is another sentence having no entailment relationship with the representative sentence, it can be said that there is any relationship, such as co-occurrence relationship, between the representative sentence and the other sentence. For example, when merging clusters on the basis of the degree of overlapping of elements in the clusters, there is a co-occurrence relationship. Here, the co-occurrence relationship means a simultaneous semantic relationship which is likely to appear in one sentence. For example, when there are a large number of other sentences C each expressing the meaning of a sentence A and the meaning of a sentence B in the same sentence, statistically, it can be said that there is a co-occurrence relationship between the sentence A and the sentence B.

For example, it is assumed that there is a sentence set U1 including five sentences as follows.

Sentence set U1
Sentence T1: X company sold cars.
Sentence T2: X company is a car dealer.
Sentence T3: X company bought cars.
Sentence T4: X company launched a Kei car.

Sentence T5: X company bought sedans and sold Kei cars.

In the sentence set U1, the sentence T2 entails the sentence T1. Furthermore, the sentence T2 entails the sentence T3. Furthermore, the sentence T4 entails the sentence X1. Furthermore, the sentence T5 entails the sentences T1, T2, and T4. The sentences T2, T4, and T5 each entail the sentence T1. In addition, the sentences T2 and T5 each entail the sentence T3. Furthermore, the sentence T5 entails sentence T4. These entailment relationships are illustrated as in FIG. 5.

FIG. 5 is an explanatory diagram illustrating an example of the entailment relationship in the sentence set U1. In FIG. 5, a circular symbol indicates one sentence. Furthermore, an arrow indicates that a sentence from which the arrow extends entails a sentence to which the arrow extends.

Figure 6:
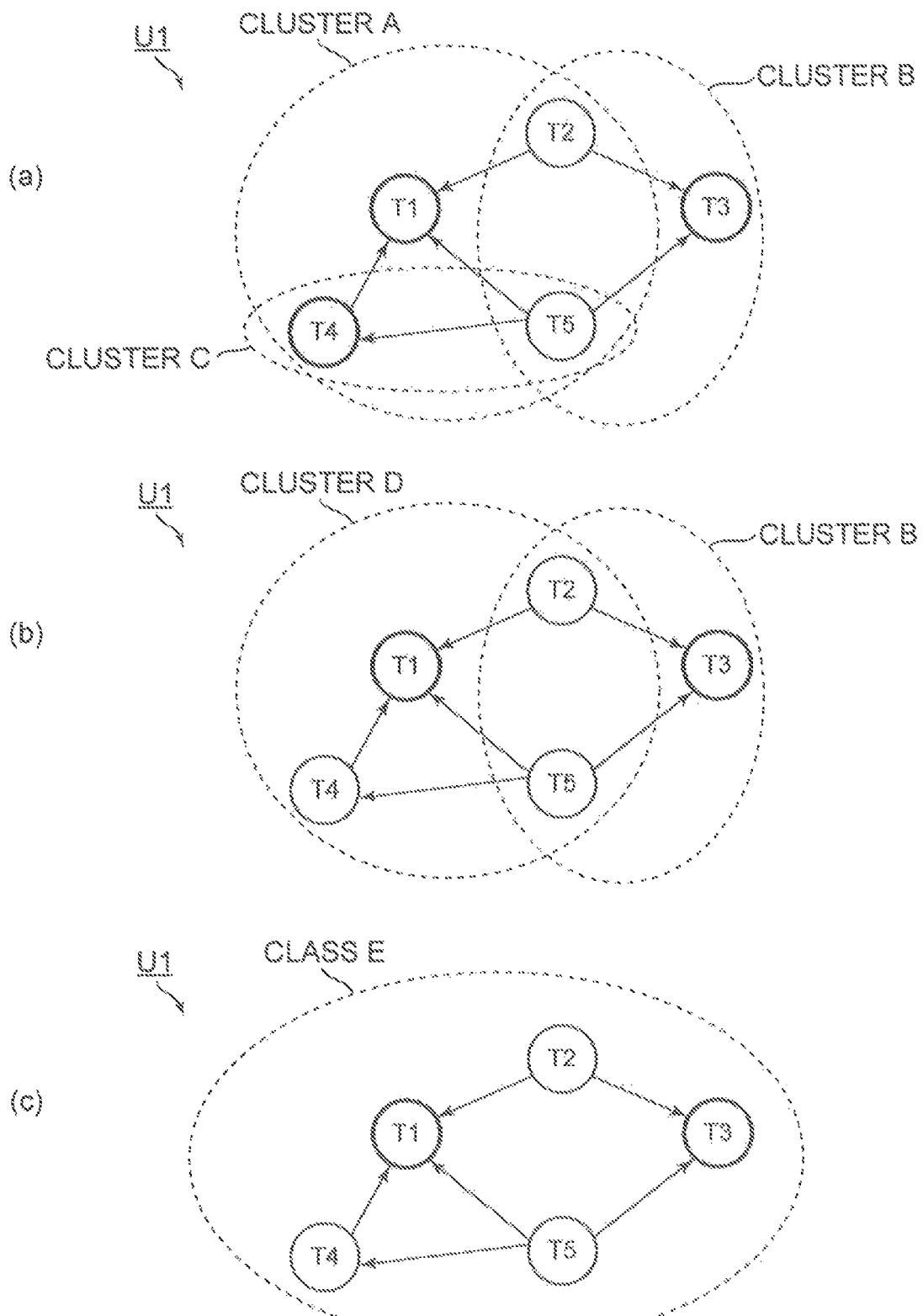
FIGS. 6(a) to 6(c) They depict explanatory diagrams illustrating examples of results of entailment clustering for the sentence set U1.

FIGS. 6(a) to 6(c) are explanatory diagrams illustrating examples of results of entailment clustering performed on the sentence set U1. For example, as a result of the entailment clustering, it is assumed that sentences entailing the sentence T1 are classified as a cluster A having the sentence T1 as a representative sentence, as illustrated in FIG. 6(a). Likewise, it is assumed that sentences entailing the sentence T3 are classified into a cluster B having the sentence T3 as a representative sentence. Likewise, it is assumed that a sentence entailing the sentence T4 is classified into a class C having the sentence T4 as a representative sentence. In this configuration, the cluster A includes the sentences T2, T4, and T5 as elements, in addition to the sentence T1 as the representative sentence. Likewise, the cluster B includes the sentences T2 and T5 as elements, in addition to the sentence T3 as the representative sentence. Likewise, the cluster C includes the sentence T5 as an element, in addition to the sentence T4 as the representative sentence. Note that one sentence may belong to a plurality of clusters in some cases. In FIG. 6(a), it can be said that although there is no direct entailment relationship between the sentence T2 and the sentence T4, an entailment relationship is established through the representative sentence T1. This is because both of the sentences T2 and T4 contain the meaning of the sentence T1 as a connotation. In this way, when the meaning of one sentence is similar to any of the connotations of another sentence (e.g., the meaning of the sentence T1 corresponding to one of the connotations of the sentence T4), these sentences may be in an "entailment relationship" in a broad sense. Such an entailment relationship is a concept including an entailment relationship (in a narrow sense: in which sentences in the same cluster, other than a common representative sentence, entail each other in at least one common connotation, that is, a connotation of the common representative sentence, in addition to an entailment relationship (in a narrow sense) in which a sentence in the same cluster, other than a representative sentence, entails the representative sentence (common another sentence). The entailment relationship (in a narrow sense) in which sentences in the same cluster, other than a common representative sentence, entail each other in at least one common connotation, that is, a connotation of the common representative sentence can be also said to be a relationship in which the sentences in the same cluster, other than the representative sentence, have a meaning similar to the connotation of the representative sentence.

Depending on the method of entailment clustering, it is considered that clusters are merged on the basis of the degree of overlapping of elements. For example, all of the elements of the cluster C are included in the cluster A. In such a constitution, the cluster A and the cluster C are considered to be merged to form a cluster D as illustrated in FIG. 6(b).

Furthermore, with reference to FIG. 6(b), more than half of the elements of the cluster B are included in the cluster D. In such a constitution, the cluster B and the cluster D are considered to be merged to form a cluster E as illustrated in FIG. 6(c). At this time, for a representative sentence of the cluster E, the sentence T1 may be selected which has been the representative sentence of the cluster D having a larger number of elements. In such a constitution, in the cluster E, an entailment relationship may not be established between the sentence T1 as the representative sentence and the sentence T3 as another sentence. However, the sentence T1 and the sentence T3 have verbs "sell" and "buy" in expressions, respectively, and the meanings of the verbs are expressed together as apparent from the expression such as "sale". Hereinafter, when two sentences not having an entailment relationship but having a predetermined relationship, such as a co-occurrence relationship, belong to the same cluster, as a result of such an entailment clustering process, the sentences are defined to "have an entailment relationship" in a broad sense. Such an entailment relationship is a concept including a co-occurrence relationship between sentences belonging to the same cluster, in addition to the entailment relationship (in a narrow sense) in which a sentence in the same cluster, other than a representative sentence, entails the representative sentence (common another sentence), and the entailment relationship (in a narrow sense) in which sentences in the same cluster, other than a common representative sentence, entail each other in at least one common connotation, that is, a connotation of the common representative sentence.

The difference identification unit 120 identifies the presence/absence, an amount, or a portion of a difference between articles including sentences having an entailment relationship, on the basis of a result of processing by the entailed sentence identification unit 110. For example, the difference identification unit 120 may receive input of the information output from the entailed sentence identification unit 110 to identity a set of sentences in an entailment relationship, for each article, and determine the presence or absence of a difference and/or the amount of difference between articles including the sentences. For example, the difference identification unit 120 may determine only the amount of difference between target articles, and determine that there is a difference when the determined amount of difference is equal to or larger than a predetermined threshold.

Hereinafter, it is assumed that a sentence identified as a first sentence by the sentence 1-1, and a sentence identified as a second sentence by the sentence 2-2 are in an entailment relationship. Here, the first sentence is included in a first article with an article ID=1. Furthermore, the second sentence is included in a second article with an article ID=2. In this case, the difference identification unit 120 may determine the presence or absence of a difference and/or the amount of difference between the first article including the first sentence and the second article including the second sentence. At this time, the difference identification unit 120 may compare sentences other than the first sentence included in the first article with all sentences included in the second article to identify a sentence having a difference. Note that the difference portion is not limited to a sentence, and may be for example a specific part of speech, a clause, a chart, or the like.

The presence or absence of a difference and/or the amount of difference between articles or sentences may be determined on the basis of how much words included in one article or sentence are included in the other article or sentence, that is, using the degree of overlapping, and at this time, similarity may be determined in consideration of synonyms or hypernyms of words.

Furthermore, the difference identification unit 120 stores an obtained result. For example, the difference identification unit 120 may store an article ID of another article determined to have a difference relative to the first article including the first sentence or a sentence ID of a sentence in the other article determined to have a difference, in association with a sentence ID as identification information of the first article. Furthermore, when determining only the amount of difference without determining the presence or absence of a difference, the difference identification unit 120 may, for example, store a set of an article ID of the other article from which the amount of difference is determined and the determined amount of difference, in association with a sentence ID as identification information of the first article.

Furthermore, when a sentence having a difference is identified, a sentence ID of the sentence having a difference or a determined amount of difference may be recorded, in addition to the correspondence relationship described above.

Furthermore, the presence or absence of a difference or the amount of difference between articles may not be determined for all of the sentences in the article. Since sentences to be a main sentence are often in the first half of the articles, the difference identification unit 120 may determine the presence or absence of a difference or the amount of difference between articles, for example, for only the first half of each article.

On the basis of a result of determination of the entailment relationship between sentences by the entailed sentence identification unit 110, and a result of identification of a difference between articles by the difference identification unit 120, the visualization unit 130 generates and displays a screen suitable for the user to collect information.

For example, when displaying an article stored in the article storage unit 100, where a sentence having an entailment relationship with each sentence in the article is included, and there is another article having a difference relative to the article, the visualization unit 130 may add link information linked to the other article to display the article. At this time, when link information to a plurality of other articles can be given to one sentence in the article to be displayed, the link information may be given to preferentially display other articles in descending order of difference. For example, when displaying a link destinations list or the like displaying, as link destinations, only other articles satisfying a predetermined condition that, for example, an amount of difference is within a predetermined number in a descending order or is not less than a predetermined threshold, the visualization unit 130 may display articles on the list in descending order of the amount of difference.

In addition, the visualization unit 130 may display an emphasized difference portion when displaying another article or a partial content of the article as the link destination.

Figure 8:
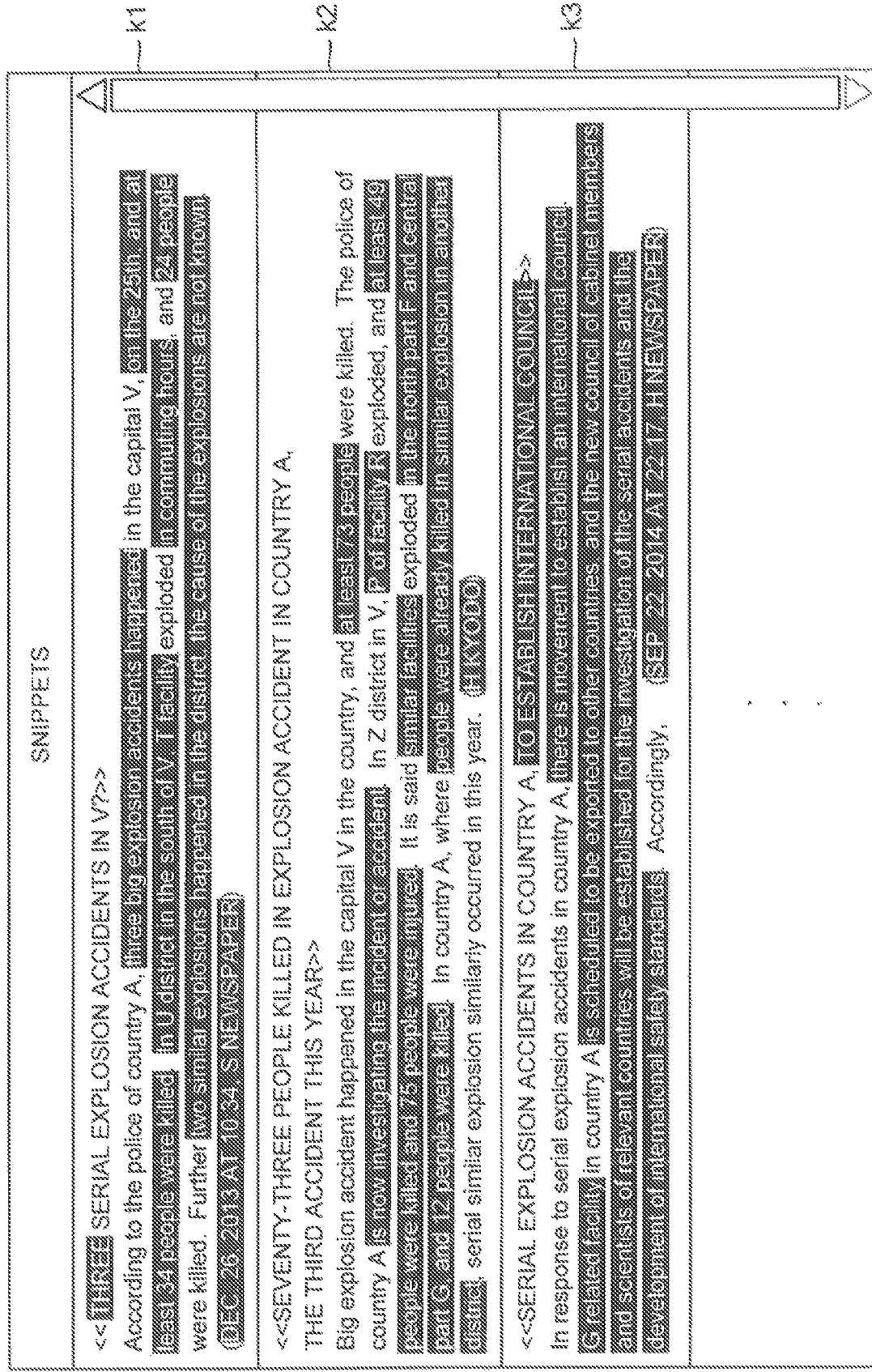
FIG. 8 It depicts an explanatory view illustrating an example of display by the visualization unit 130.

FIG. 7 and FIG. 8 are explanatory views illustrating examples of display by the visualization unit 130. Note that FIG. 7 illustrates an example of display of an article to which link information is given by the visualization unit 130. In FIG. 7, an underline applied to a sentence in the article represents that a link is set to the sentence. In addition, a speech bubble at the end of an underlined sentence indicates the number of link destination articles. For example, as illustrated in FIG. 7, when an article is displayed, the visualization unit 130 may process the article to show the presence or absence of a link to an article having related information or the number of linked articles are made, for each sentence in the article. Note that in the present example, giving link information to an article to be able to automatically access to an link destination article according to the user's input is expressed as setting a link.

FIG. 8 is an explanatory view illustrating an example of a list of link destination articles set to a sentence in an article. For example, as illustrated in FIG. 8, when a specific sentence is selected from a displayed article, the visualization unit 130 may display a list of information of the link destination articles set to the sentence. At this time, the visualization unit 130 may display articles on the list in descending order of the difference relative to the displayed article. Furthermore, the visualization unit 130 may display snippets of the linked articles as the information of the linked articles. When displaying a snippet of an article in the list, the visualization unit 130 may snip and display a sentence having an entailment relationship with a link source sentence in a link destination article, or a sentence showing a difference relative to an article including a link source sentence in a link destination article. In FIG. 8, k1 to k3 are snippets of link destination articles. A sentence surrounded by "<< >>" is a sentence having an entailment relationship with a link source sentence in a link destination article. Furthermore, a sentence below the sentence is a sentence having a difference relative to an article including the link source sentence in the link destination article. Furthermore, in FIG. 8, as an example of difference emphasis display, a black highlighted difference portion identified on the basis of the overlapping ratio of words between the article including the link source sentence and the link destination article is displayed, in each of the snippets of the articles, but the difference emphasis display is not limited thereto. For example, in the difference emphasis display, the difference portion may be displayed in a distinguishable mode, such as different color or font of letters corresponding to the difference portion. For example, as illustrated in FIG. 8, the visualization unit 130 may display the information of the articles to which links are made. An example of displaying the information of a link destination article includes directly displaying the article, displaying a list of information (titles or portions) about the article, displaying a snippet of the article or a list of the snippets with difference emphasis display, or the like. At this time, one or more linked articles may be processed to generate a new article (processed article) for display. In the above example, the snippet, emphasis display, and list are examples of processing of linked articles. The visualization unit 130 may set a link to a processed article generated for a link source sentence.

Figure 9:
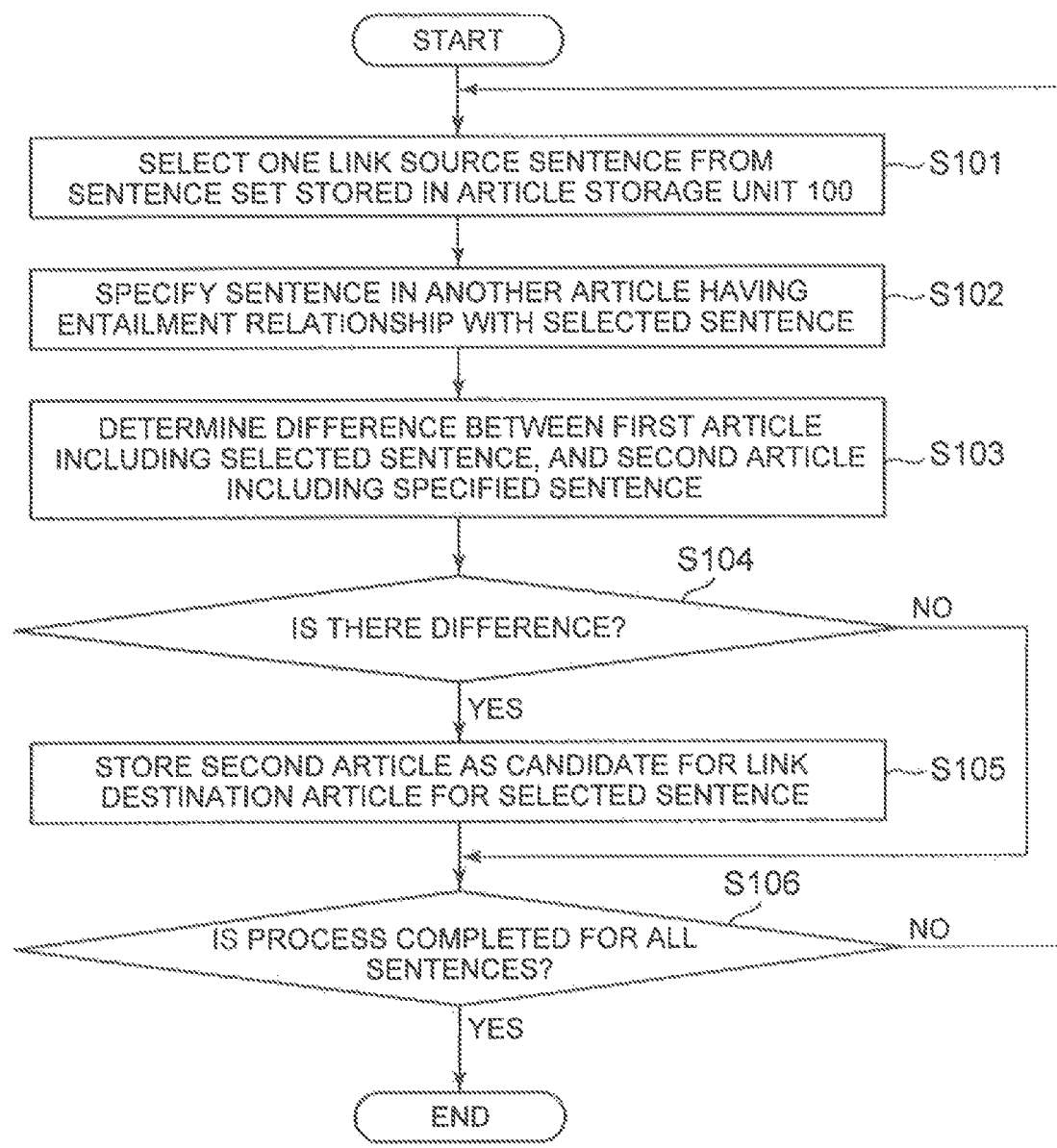
FIG. 9 It depicts a flowchart illustrating an operation example of an article management system 1.

Next, the operation of the present exemplary embodiment will be described. FIGS. 9 to 12 are flowcharts illustrating operation examples of the article management system 1 according to the present exemplary embodiment. FIG. 9 is a flowchart illustrating an example of a related information association process by the article management system 1 according to the present exemplary embodiment.

In the example illustrated in FIG. 9, first of all, the entailed sentence identification unit 110 selects one link source sentence from a set of sentences (first sentence set) constituting each article stored in the article storage unit 100 (step S101). Hereinafter, a sentence selected in step S101 may be referred to as a first sentence.

Next, the entailed sentence identification unit 110 identifies a sentence in an article different from the first article including the selected first sentence, and having an entailment relationship with the first sentence, from the first sentence set (step S102). Hereinafter, a sentence identified in step S102 may be referred to as a second sentence.

For example, in step S102, the entailed sentence identification unit 110 may compare the first sentence with each sentence included in an article other than the article including the first sentence, determine the presence or absence of an entailment relationship, and identify the second sentence. Furthermore, for example, the entailed sentence identification unit 110 may perform an entailment clustering process on the first sentence set to identify, as the second sentence, another sentence belonging to a cluster to which the first sentence belongs on the basis of information of the cluster obtained as a result of the entailment clustering process.

Next, the difference identification unit 120 determines a difference between the first article including the first sentence, and the second article including the second sentence (step S103). Here, when there is a difference between the first article and the second article (Yes in step S104), the difference identification unit 120 stores the second article as a candidate for a link destination article for the first sentence (step S105). Then, the process proceeds to step S106.

In contrast, when there is no difference between the first article and the second article (No in step S104), the process directly proceeds to step S106.

In step S106, it is determined whether step S101 and subsequent steps have been completed for all sentences included in the sentence set. As a result of the determination, when the steps are completed, the process ends (Yes in step S106), and when the steps are not completed, the process returns to step S101 and a next link source sentence is selected (No in step S106).

The article management system 1 repeats a series of steps S101 to S105 until all sentences included in the first sentence set are selected as the link source sentence in this manner.

The article management system 1 may perform the operation illustrated in FIG. 9, for example, upon receiving specification of a target sentence set.

Figure 10:
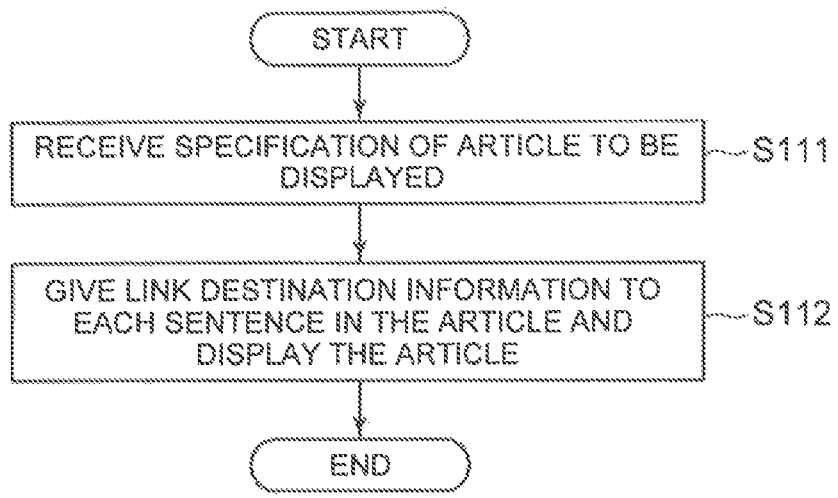
FIG. 10 It depicts a flowchart illustrating an operation example of an article management system 1.
Figure 11:
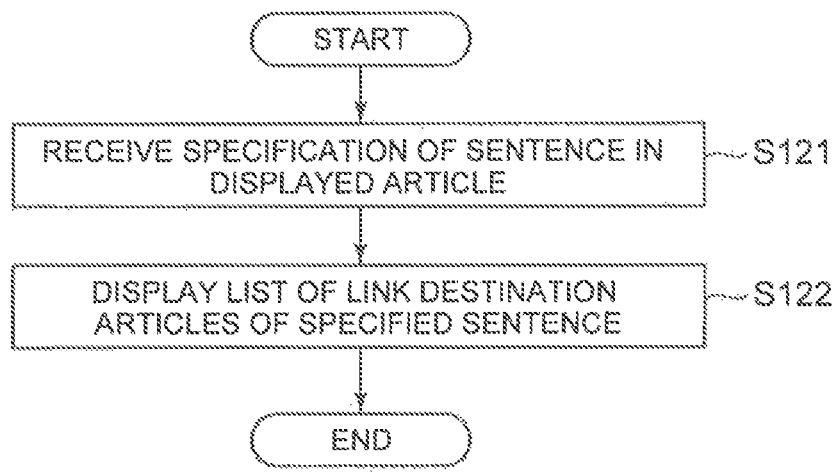
FIG. 11 It depicts a flowchart illustrating an operation example of an article management system 1.
Figure 12:
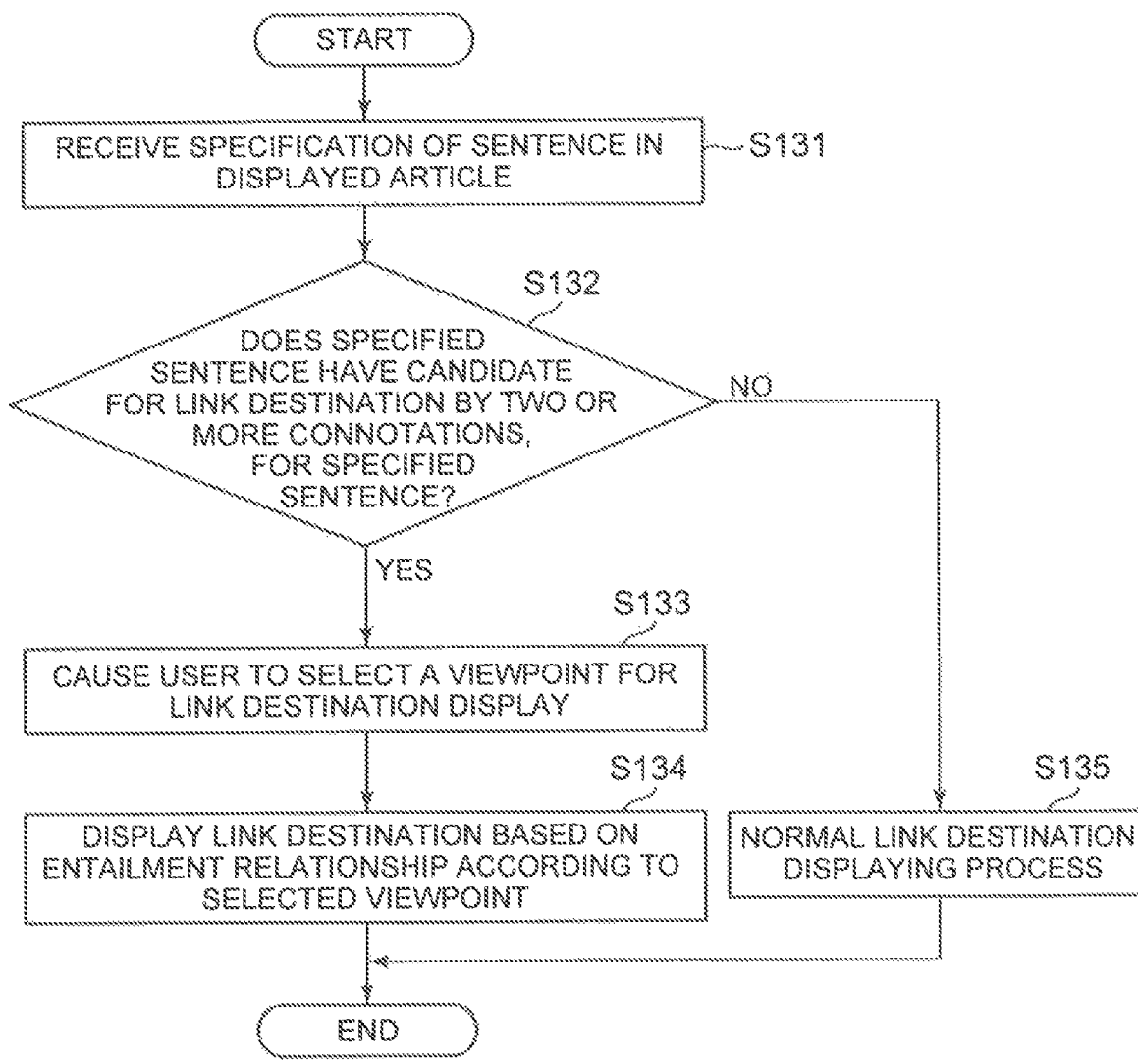
FIG. 12 It depicts a flowchart illustrating an operation example of an article management system 1.

Furthermore, FIGS. 10 to 12 are flowcharts illustrating operation examples of the visualization unit 130. First, the example illustrated in FIG. 10 will be described. In the example illustrated in FIG. 10, first of all, the system receives specification of an article to be displayed (step S111). For example, the system may receive specification of any of articles stored in the article storage unit 100 from the user.

Upon receiving the specification of the article to be displayed, the visualization unit 130 gives link information to each sentence included in the specified article on the basis of information of link destination candidate articles stored in advance, and display the article (step S112). For example, the visualization unit 130 may give the information of linked articles as illustrated in FIG. 7 to display the specified article.

Next, the example illustrated in FIG. 11 will be described. In the example illustrated in FIG. 11, it is assumed that any of the articles stored in the article storage unit 100 is displayed. Then, the system receives specification of a sentence in the displayed article (step S121). For example, the system may receive specification of any of the sentences included in the displayed article, from the user.

Next, upon the specification of a sentence in step S121, the visualization unit 130 displays a list of link destination articles for the specified sentence, on the basis of information of link destination candidate articles stored in advance (step S122). For example, the visualization unit 130 may display a list of linked articles including snippets of the articles as illustrated in FIG. 8. The method of displaying the list of linked articles is not limited to the method illustrated in FIG. 8. For example, the visualization unit 130 may display a title list or the like of the linked articles, in the form of a balloon or the like, near the specified sentence in the displayed article.

Next, the example illustrated in FIG. 12 will be described. In the example illustrated in FIG. 12 as well, it is assumed that any of the articles stored in the article storage unit 100 is displayed. Then, the system receives specification of a sentence in the displayed article (step S131). For example, the system may receive specification of any of the sentences included in the displayed article, from the user.

Next, upon the specification of the sentence in step S121, the visualization unit 130 determines whether the specified sentence has link destination candidate articles in two or more connotations respectively, for the specified sentence, on the basis of information or the like of a result of identification of the entailment relationship, stored in advance (step S132).

For example, when the specified sentence belongs to two or more clusters, and an article including a linked article including another sentence having an entailment relationship in two or more clusters of the two or more clusters, the visualization unit 130 may determine that the specified sentence has link destination candidate articles in two or more connotations respectively. In this configuration, the meanings of representative sentences of two or more clusters satisfying the conditions described above correspond to the two or more connotations in which the specified sentence has the link destination candidate articles respectively.

Hereinafter, detailed description will be made using the sentence set U1. For example, it is assumed that a result of the entailment clustering is obtained as illustrated in FIG. 5(*a*). At this time, the sentence T2 belongs to the cluster A and the cluster B. In such a conditions the visualization unit 130 may determine that the sentence T2 has link destination candidate articles in two or more connotations. Note that, in the present example, it is assumed that another sentence belongs to both of the clusters A and B, where the other sentence is included in an article different from the article including the sentence T2, and the different article is set as a link destination candidate article. For example, it is preferable that any of the sentences T1, T4, and T5 included in the cluster A is included in an article different from the article including the sentence T2, and the different article is set as a linked article to which the sentence T2 is linked, and furthermore, any of the sentences T3 and T4 included in the cluster B is included in an article different from the article including the sentence T2, and the different article is set as a linked article to which the sentence T2 is linked. In this situation, "two or more connotations" in which the sentence T2 has link destination candidate articles corresponds to the meaning of the sentence T1 as the representative sentence of the cluster A, and the meaning of the sentence T3 as the representative sentence of the cluster B.

Furthermore, for example, it is assumed that a result of the entailment clustering is obtained as illustrated in FIG. 5(*a*). At this time, the sentence T4 belongs to the cluster A and the cluster C. In such a condition, the visualization unit 130 may determine that the sentence T4 has link destination candidate articles in two or more connotations. Note that, in the present example. It is assumed that another sentence belongs to both of the clusters A and C, where the other sentence is included in an article different from the article including the sentence T4, and the different article is set as a link destination candidate article. In other words, it is assumed that, in the cluster A, any of the sentences T1, T2, and T5 included in the cluster A is included in an article different from the article including the sentence T4, and the different article is set as a link destination candidate article to which the sentence T4 is linked. Furthermore, it is assumed that, as in the cluster C, the sentence T5 included in the cluster C is included in an article different from the article including the sentence T4, and the different article is set as a linked article to which the sentence T4 is linked. In this situation, the two or more connotations in which the sentence T4 has link destination candidate articles corresponds to the meaning of the sentence T1 as the representative sentence of the cluster A, and the meaning of the sentence T4 as the representative sentence of the cluster C.

As a result of the determination in step S132, when the first sentence is determined not to have link destination candidate articles in two or more connotations (No in step S132), the visualization unit 130 may display a normal link (step S133). In that condition, the visualization unit 130 may perform step S122 described above, for example, for displaying the link.

In contrast, when the first sentence is determined to have link destination candidate articles in two or more connotations (Yes in step S132), the visualization unit 130 may cause the user to select a viewpoint for displaying links (Step S133). For example, the visualization unit 130 may display a list of sentences expressing two or more connotations identified as a result of the determination, to inquire whether to display, as a link, related information about which connotation. Therefore, it is possible to identify a connotation corresponding to a viewpoint of interest to the user from among the connotations of the first sentence.

For example, it is assumed that a sentence T4 is selected from the sentence set U1. Note that the expression of the sentence T4 is "X company presented a Kei car", and meaning thereof is "X company presented a Kei car". Then, it is assumed that, as a result of the determination in step S132, as the two or more connotations in which the sentence T4 has link destination candidate articles, the meaning of the sentence T1 "X company sold cars", and the meaning of the sentence T4 "X company presented a Kei car" are identified. In the present example, it is assumed that all articles including the sentences T1, T2 and T5 are articles other than the article including the sentence T4, and have contents different from the contents of the article including the sentence T4. Therefore, for the sentence T4, each of the articles including the sentences T1, T2 and T5 is extracted as a link destination candidate article. Here, for the sentence T4 as the link source sentence, the sentences T1, T2 and T5 correspond to the other sentences in the entailment determination when they are defined as the link destination candidate articles.

In the present example, of the sentences T1, T2 and T5, only the sentence T1 corresponds in meaning to the two or more connotations in which the sentence T4 has link destination candidate articles. This is because the sentences T2 and T5 may each have a connotation other than the connotations of the sentence T4. For example. The link from the sentence T4 to the article including the sentence T1 will be described. Note that a relationship between the sentence T4 and the sentence T1 is a relationship in which the sentence T4 entails the sentence T1. Therefore, it can be considered that the link makes an association on the basis of any of the connotations of the sentence T1 corresponding to a common connotation of the two sentences. In such a condition, it is preferable that the sentence T1 expressing all of the connotations being the base of the association is presented to the user as a candidate for the viewpoint for displaying links. Likewise, for example, the link from the sentence T4 to the article including the sentence T5 will be described. Note that a relationship between the sentence T4 and the sentence T5 is a relationship in which the sentence T5 entails the sentence T4. Therefore, it can be considered that the link makes an association on the basis of any of the connotations of the sentence T4 corresponding to a common connotation of the two sentences. Thus, it is preferable that the sentence T4 expressing all of the connotations being the basis of the association is presented to the user as a candidate for the viewpoint for displaying links. Likewise, the link from the sentence T4 to the article including the sentence T2 will be described. A relationship between rise sentence T4 and the sentence T2 is a relationship associated through the sentence T1 as the representative sentence of the cluster. From such a relationship, it can be considered that the link makes an association on the basis of any of the connotations of the sentence T1 being a common element of the two sentences. Thus, it is preferable that the sentence T1 expressing ad of the connotations being the basis of the association is presented to the user as a candidate for the viewpoint for displaying links. From the above description, the sentence T4 and the sentence T1 are presented to the user as sentences expressing connotations in which the sentence T4 has link destination candidate articles so that the user selects a viewpoint for displaying links from the sentences T4 and T1.

Note that the visualization unit 130 may make an inquiry, such as "Which meaning do you select as the viewpoint to present links to the related information?", using the sentences T1 and T4 as candidates for the viewpoint for displaying links.

When a viewpoint for displaying links is determined, the visualization unit 130 displays links on the basis of an entailment relationship according to the viewpoint (step S135). The visualization unit 130 displays links of only link destination candidate articles from among the link destination candidate articles set for the first sentence. The selected link destination candidate article has an entailment relationship having been identified a link destination candidate article, which is a relationship entailing a sentence selected as the viewpoint.

For example, it is assumed that, in the above example, when the sentence T4 is specified, the sentence T1 is selected as a result of presentation of the sentences T1 and T5 as the candidates for the viewpoint for displaying links. In this condition, the visualization unit 130 preferably displays links, only for the article including the sentence T1 or the articles including other sentences (sentences T2 and T5) entailing the sentence T1, and having a content different from the article including the sentence T4, of link destination candidates set for the sentence T4. This is because when the user is interested in the connotation "X company sold cars" in the connotation of a sentence "X company launched a Kei car", it is determined that other articles including sentences having meanings similar to the connotation "X company sold cars" are preferably collected. Note that, although not shown in the above example, when a sentence having the connotation "X company launched a Kei car" corresponding to a subordinate concept of the connotation "X company sold cars" is included in another article, the article is also collected.

Furthermore, for example, it is assumed that the sentence T4 is selected in the above example. In this condition, the visualization unit 130 preferably displays links, only for the article including another sentence (sentence T5) entailing the sentence T4, and having a content different from the article including the sentence T4, of the link destination candidate articles set for the sentence T4. This is because when the user is interested in the connotation "X company launched a Kei car" in the connotation of the sentence "X company launched a Kei car", it is determined that other articles including sentences having meanings similar to the connotation "X company launched a Kei car" are preferably collected. Note that in this condition, articles including sentences T1 and T2 entailing the sentence T4, but not having a meaning similar to the connotation "X company launched a Kei car" are excluded from the link destination candidate articles.

As described above, according to the present exemplary embodiment, the user can efficiently collect information relating to a specific viewpoint in articles. More specifically, since the user can easily access articles including at least a sentence having the same connotation as a viewpoint of interest in the article, and having a different content as a whole, information relating to a specific viewpoint in an article can be efficiently collected. For example, the user is only required to follow a link given to a sentence expressing a content of interest to easily access information relating to the content of interest, and time required to collect information can be reduced.

The article management system 1 according to the present exemplary embodiment may have a configuration in which two or more physically separated devices are connected in a wired or wireless manner. The same applies to systems and apparatuses according to other exemplary embodiments described below.

Exemplary Embodiment 2

Next, a second exemplary embodiment according to the present invention will be described, in the first exemplary embodiment, a system has been mainly exemplified for providing information desired by the user by associating each sentence included in a specified sentence set with information of another article including a related content, on the basis of a result of entailment determination between sentences included in different articles.

In the present exemplary embodiment, a description will be made of a related article determination device which determines whether a specified article is a related article having information relating to a specified sentence in an article, without using identification information or the like assigned to the articles.

Figure 13:
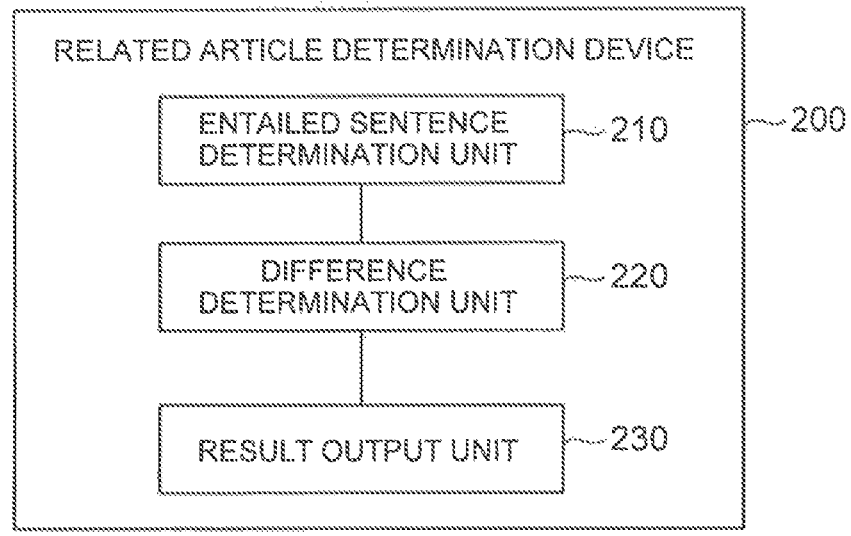
FIG. 13 It depicts an exemplary block diagram illustrating a related article determination device according to a second exemplary embodiment.

FIG. 13 is an exemplary block diagram illustrating the related article determination device according to the second exemplary embodiment of the present invention. The related article determination device 200 illustrated in FIG. 13 includes an entailed sentence determination unit 210, a difference determination unit 220, and a result output unit 230. The related article determination device 200 illustrated in FIG. 13 receives input of specification of a first sentence being a sentence in an article, and specification of a second article being an article to be determined, and outputs at least information representing whether the second article is a related article having information relating to the first sentence. Hereinafter, an article including the first sentence is referred to as a first article. In the present exemplary embodiment, the first article and the second article may be the same or different. Furthermore, more specifically, the related article may be an article including a sentence having a meaning similar to any of the connotations of a specified sentence (first sentence), and having a content different from that of an article including the specified sentence.

The entailed sentence determination unit 210 determines whether a sentence having an entailment relationship with the first sentence is included in the second article.

For example, the entailed sentence determination unit 210 may select sentences included in the second article one by one in order, and determine whether there is an entailment relationship between the selected sentences and the first sentence. More specifically, the entailed sentence determination unit 210 determines whether the selected sentences entail the first sentence or the first sentence entails the selected sentences, by using entailment determination. When the entailment relationship is established between any of the selected sentences and the first sentence as a result of such entailment determination, the entailed sentence determination unit 210 may determine that a sentence having an entailment relationship with the first sentence is included in the second article.

In addition, the entailed sentence determination unit 210 may perform entailment clustering on, for example, the first sentence and all the sentences included in the second article. Then, when a cluster including the first sentence includes a sentence other than the first sentence, the entailed sentence determination unit 210 may determine that a sentence having an entailment relationship with the first sentence is included in the second article.

When the entailed sentence determination unit 210 determines that a sentence having an entailment relationship with the first sentence is included in the second article, the difference determination unit 220 determines a difference between the second article and the first article. Furthermore, the difference determination unit 220 may determine a portion of a difference relative to the first article, in the second article, in addition to the difference between the articles. A method of determining the presence or absence of a difference and/or the amount of difference between articles, or a method of determining a portion of a difference in an article is preferably similar to the method performed by the difference identification unit 120 according to the first exemplary embodiment.

When the difference determination unit 220 determines that there is a difference between the second article and the first article, the result output unit 230 outputs a result of the determination representing that the second article is a related article having information relating to the first sentence. The result output unit 230 may output the amount of difference relative to the first article in the second article, or information representing a portion in the second article, regarded to have a difference relative to the first sentence, in addition to the determination result.

Figure 14:
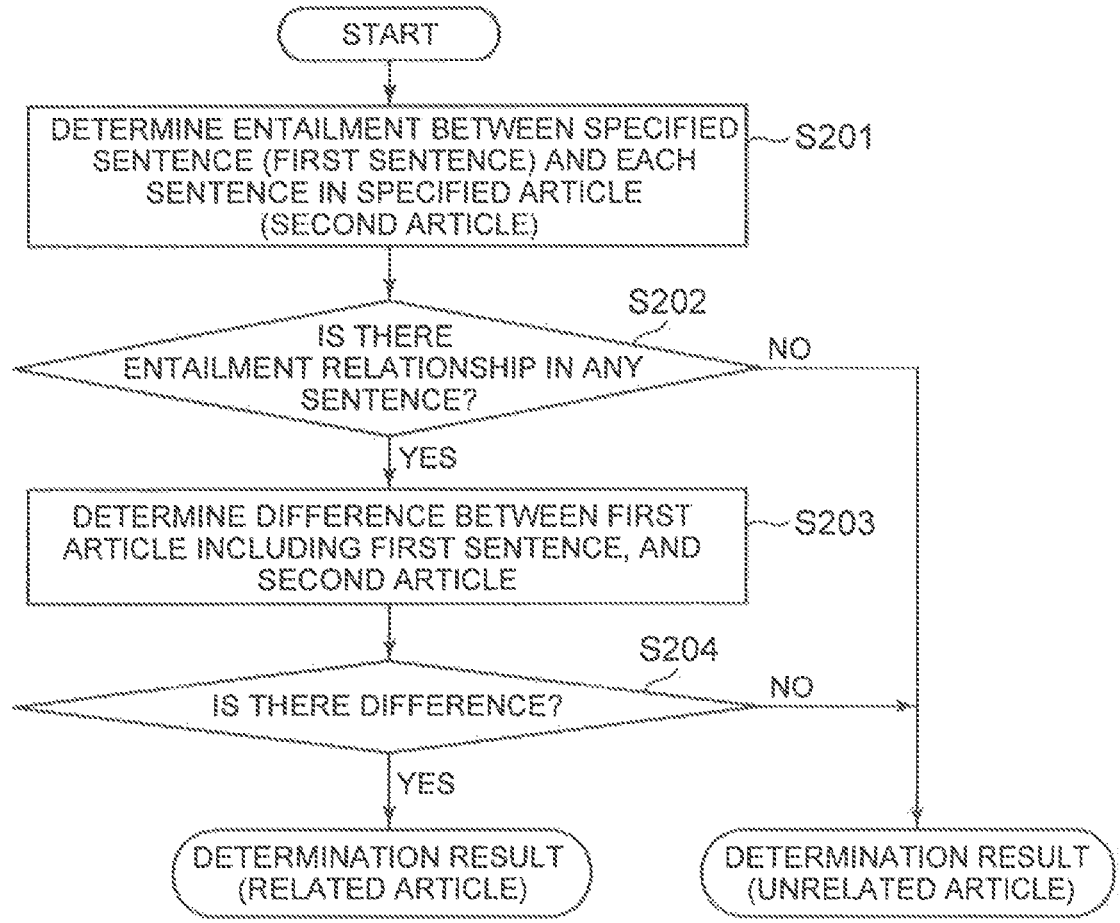
FIG. 14 It depicts a flowchart illustrating an operation example of the related article determination device 200.

Next, the operation of the present exemplary embodiment will be described. FIG. 14 is a flowchart illustrating an operation example of the related article determination device 200 according to the present exemplary embodiment.

In the example illustrated in FIG. 14, first of all, the entailed sentence determination unit 210 determines the presence or absence of an entailment relationship between a specified sentence (first sentence) and each sentence in a specified article (second article) (step S201). As a result of step S201, when it is determined that there is an entailment relationship between the first sentence and any of the sentences in the second article (Yes in step S202), the process proceeds to step S203.

In step S203, the difference determination unit 220 determines a difference between the first article including the first sentence and the second article (step S203).

As a result of step S203, when it is determined that there is a difference between the first article and the second article (Yes in step S204), the result output unit 230 outputs a message that the second article is a related article.

Otherwise (No in step S202 or No in step S204), the result output unit 230 outputs a message that the second article is not a related article.

As described above, according to the present exemplary embodiment, information representing whether a specified article is a related article to a sentence in an article.

Exemplary Embodiment 3

Figure 15:
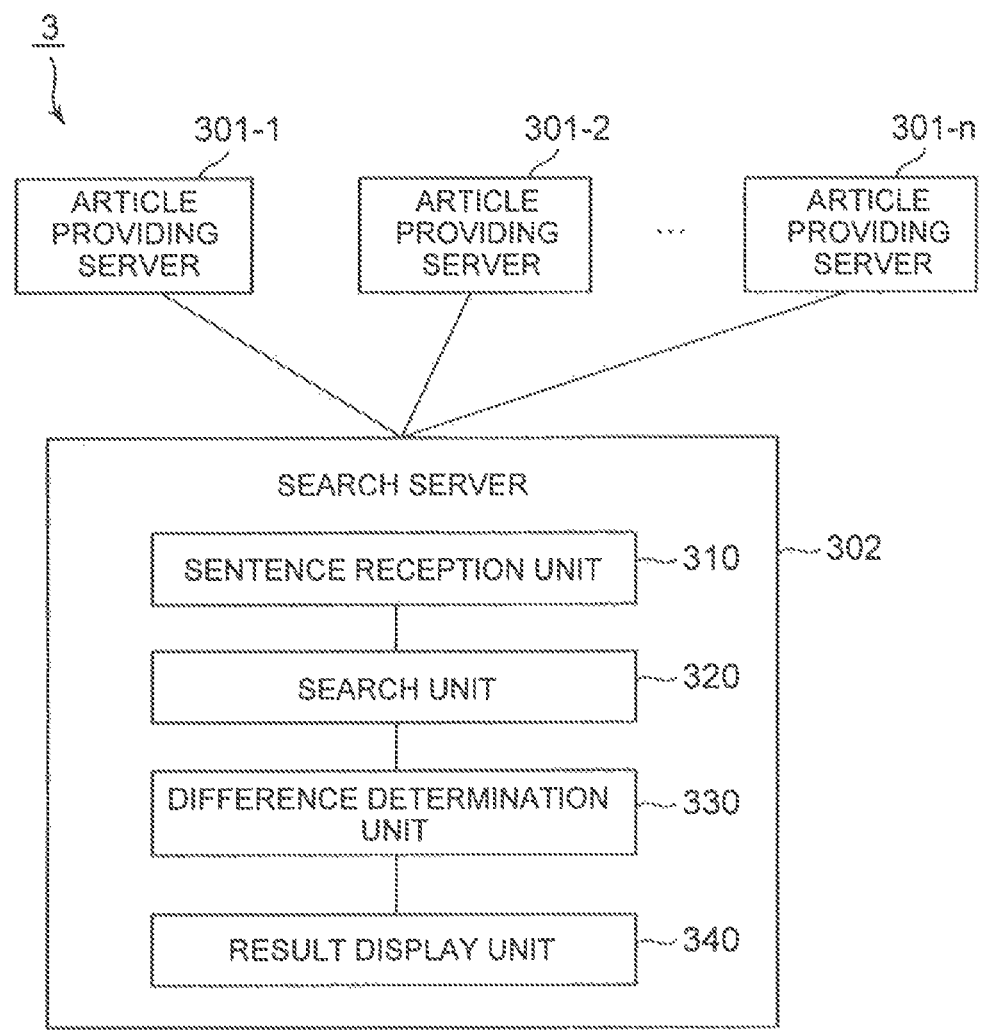
FIG. 15 It depicts an exemplary block diagram illustrating an information search system according to a third exemplary embodiment.

FIG. 15 is an exemplary block diagram illustrating an information search system according to a third exemplary embodiment of the present invention. The information search system 3 illustrated in FIG. 15 includes an article providing server 301 and a search server 302. Furthermore, the search server 302 includes a sentence reception unit 310, a search unit 320, a difference determination unit 330, and a result display unit 340.

Furthermore, in the present exemplary embodiment, the article providing server 301 and the search server 302 are connected via a communication network such as the Internet.

The article providing server 301 is a server for providing an article. The article providing server 301 may be, for example, a Web server publishing an article on the communication network. FIG. 15 illustrates an example of n article providing servers 301, but any number of article providing servers 301 may be used.

The sentence reception unit 310 receives specification of a sentence included in a published article, from a user terminal, not shown, or the like. When receiving the specification of the sentence, the search unit 320 identifies an article including the specified sentence, and outputs the specified sentence to the search unit 320 for a search query. Hereinafter, sometimes, the specified sentence is referred to as a first sentence, and the article including the first sentence as a first article.

The search unit 320 uses the first sentence specified in the search query, to search articles published by the article providing server 301 for an article including a sentence having a meaning similar to the connotation of the first sentence. Here, the search unit 320 may use a method similar to the methods performed by the entailed sentence identification unit 110 according to the first exemplary embodiment, that is, textual entailment or entailment clustering technology to search a sentence having a meaning similar to the connotation of a sentence in the search query, and acquire an article including the searched sentence. In addition, at this time, when the information of the first article is obtained, the search unit 320 may exclude the first article from the articles to be searched. Note that regardless of whether an article to be searched is the first article, the search unit 320 may determine whether the meaning of a sentence in the article to be searched is similar to the connotation of the first sentence. Even in that case, a result of determination of a difference between articles which is performed by the difference determination unit 330 can be used to prevent the first article from being displayed as a search result.

The difference determination unit 330 determines the presence or absence of a difference and/or the amount of difference between the first article and the searched article. Furthermore, the difference determination unit 330 may determine such a difference between articles, and identify a portion defined as a difference relative to the first article in the searched article. A method of determining the presence or absence of a difference and/or the amount of difference between articles, or a method of identifying a portion defined as a difference in an article is preferably similar to the method performed by the difference identification unit 120 according to the first exemplary embodiment.

From among the articles searched by the search unit 320, the result display unit 340 defines an article which is determined to have a difference by the difference determination unit 330, as a related article to the first sentence, and displays the information of the article. At this time, the result display unit 340 may display the information of the searched articles in descending order of amount of difference. The information to be displayed may have, for example, a list of the locations of corresponding articles (information or the like representing uniform resource locators (URL) or storage locations of the articles) or titles. The list may further include snippets of article contents or links to the corresponding articles or articles obtained by processing the corresponding articles. For example, the result display unit 340 may use a method similar to the method according to the first exemplary embodiment to generate a snippet article or perform difference emphasis display.

Figure 16:
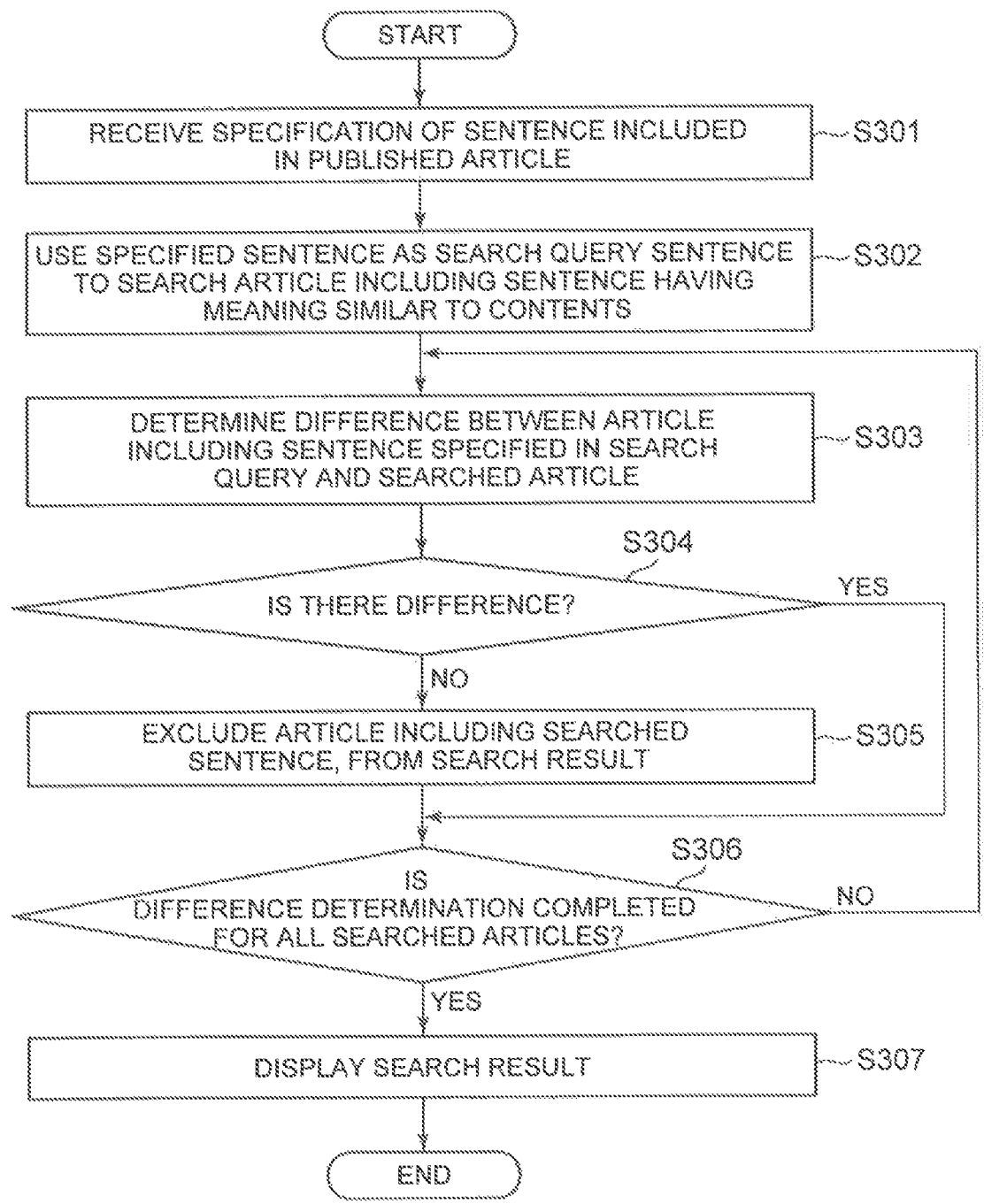
FIG. 16 It depicts a flowchart illustrating an operation example of the information search system 3.

Next the operation of the present exemplary embodiment will be described. FIG. 16 is a flowchart illustrating an operation example of the information search system 3 according to the present exemplary embodiment.

In the example illustrated in FIG. 16, first of all, the sentence reception unit 310 receives specification of a sentence included in a published article (step S301).

Next, the search unit 320 uses the sentence (first sentence) specified in step S301 as a search query sentence to search an article including a sentence having a meaning similar to any of the connotations of the first sentence from articles published by the article providing server 301 (step S302).

Next the difference determination unit 330 determines a difference between the article searched by the search unit 320, and the article (first article) including the sentence specified in the search query (step S303).

When it is determined that there is no difference as a result of the determination in step S03, the difference determination unit 330 excludes the searched article from the search result (No in step S304, step S305). Then, the process proceeds to step S306. In contrast, when it is determined that there is a difference (Yes in step S304), the process directly proceeds to step S306.

In step S306, it is determined whether the difference determination has been completed for all the searched articles. When the difference determination is not completed (No in step S306), the process returns to step S303. When the difference determination is completed, the process proceeds to step S307.

Finally, the result display unit 340 displays information of the article as a final search result (step S307).

As described above, according to the present exemplary embodiment, a user reading an article is only required to specify a sentence in the article to automatically search an article including a sentence having a meaning similar to any of the connotations of the specified sentence, and having a different content as a whole, and thus, information relating to a specific viewpoint of interest to the user can be efficiently collected.

In the search system according to the present exemplary embodiment, the difference determination unit 330 may determine only the amount of difference without determining the presence or absence of the difference between articles as described above. Even in such a case, when displaying an article searched by the search unit 320 as a search result, the result display unit 340 preferentially displays an article having a larger difference relative to the first article, so that the user can efficiently collect information relating to a specific viewpoint of interest.

Exemplary Embodiment 4

Next, a fourth exemplary embodiment will be described. In the present exemplary embodiment, a description will be made of an information collecting apparatus for automatically collecting related articles when a sentence in an article is specified.

Figure 17:
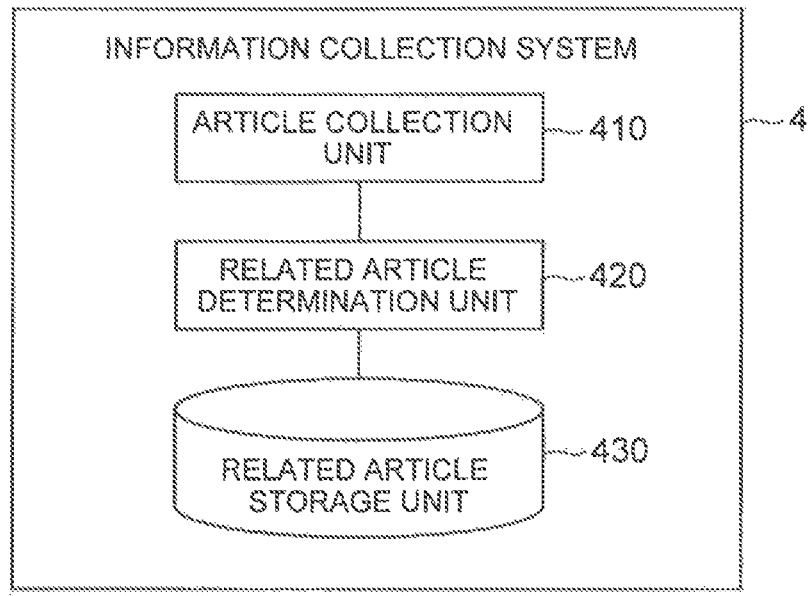
FIG. 17 It depicts an exemplary block diagram illustrating an information collection system according to a fourth exemplary embodiment.

FIG. 17 is an exemplary block diagram illustrating an information collection system according to the fourth exemplary embodiment. The information collection system 4 illustrated in FIG. 17 includes an article collection unit 410, a related article determination unit 420, and a related article storage unit 430.

When receiving specification of a sentence in an article, the article collection unit 410 collects articles using the specified sentence. A method of collecting articles in the article collection unit 410 is not particularly limited. For example, the article collection unit 410 may collect articles using a search system which uses morphological analysis.

The related article determination unit 420 determines whether each of articles collected by the article collection unit 410 is a related article relating to a specified sentence (first sentence). A method of determining a related article in the related article determination unit 420 is preferably similar to the method performed by the related article determination device 200 according to the second exemplary embodiment. Note that as the related article determination unit 420, the related article determination device 200 according to the second exemplary embodiment may be mounted.

From among the collected articles, the related article storage unit 430 stores an article determined as the related article by the related article determination unit 420. At this time, when information about the amount of difference between the related article and the article including the specified sentence, or a portion in the related article regarded as a difference relative to the article including the specified sentence can be acquired from the related article determination unit 420, the related article storage unit 430 may store the information with the related article.

Figure 18:
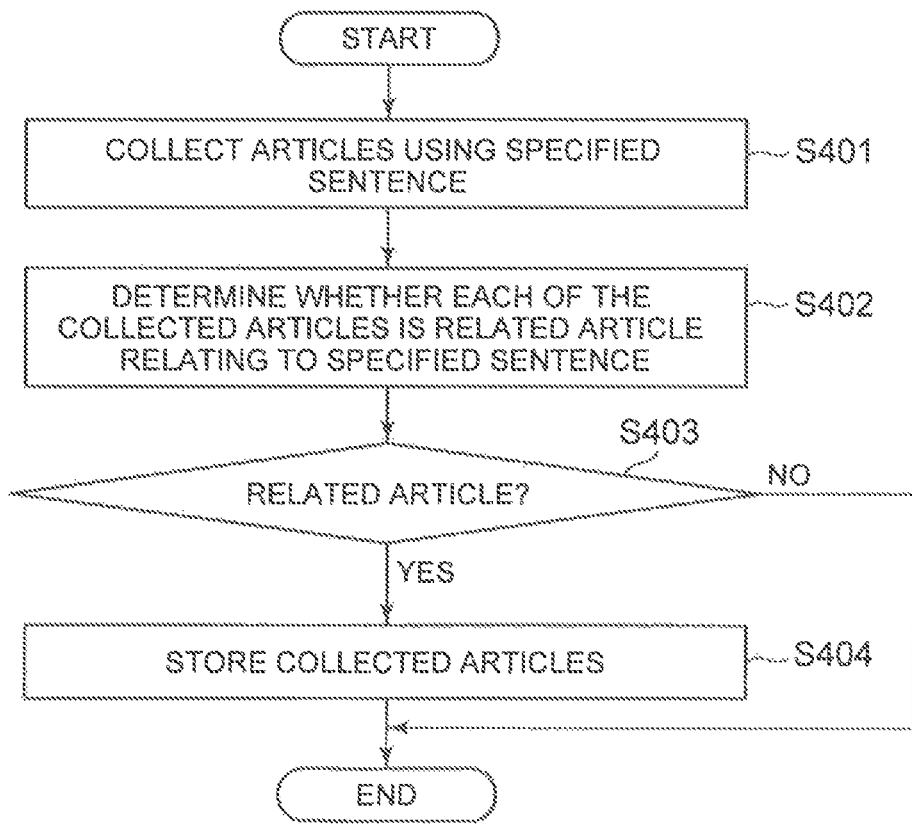
FIG. 18 It depicts a flowchart illustrating an operation example of the information collection system 4.

Next, the operation of the present exemplary embodiment will be described. FIG. 18 is a flowchart illustrating an operation example of the information collection system 4 according to the present exemplary embodiment.

Note that in the operation example illustrated in FIG. 18, it is assumed that a sentence has already beers specified by the user. First, the article collection unit 410 collects articles using a specified sentence (step S401).

Next, the related article determination unit 420 determines whether each of the collected articles is the related article relating to the specified sentence (step S402).

As a result of the determination, when the collected articles are the related articles relating to the specified sentence (Yes in step S403), the related article determination unit 420, or the article collection unit 410 receiving the result from the related article determination unit 420 stores the articles in the related article storage unit 430 (step S404).

As described above, according to the present exemplary embodiment, the user only needs to specify (register) a specific sentence (sentence expressing a content of interest) in an article including the content of interest to automatically obtain an article including a related information.

Note that the information collection system 4 may periodically perform the process illustrated in FIG. 18. In such a case, for example, the information collection system 4 may be installed as an agent function resident in an information processing device such as a user terminal connected to a communication network and automatically collecting related articles relating to a specified sentence.

Furthermore, the related article determination unit 420 according to the present exemplary embodiment can also operate, for example, as the entailed sentence identification unit 110 and the difference identification unit 120 according to the first exemplary embodiment. Furthermore, the related article determination unit 420 according to the present exemplary embodiment can also operate, for example, as the search unit 320 and the difference determination unit 330 according to the third exemplary embodiment.

Next, an example of determination of related articles by the related article determination device 200 is described using a sentence set illustrated in FIG. 19. In FIG. 19, four articles (articles A, B, C, and D) are illustrated. The contents of each article are as follows.

Article A
Sentence A-1: "Tokyo was selected to host the Olympics and Paralympics."
Sentence A-2: "According to the report of X company, there will be an economic effect of approximately 30 trillion yen."
Sentence A-3: "However, it is a problem to raise funds for a budget of approximately several trillion yen."
Sentence A-4 and subsequent sentences: " . . . (topics or the like relating to the problems of budget)"

Article B
Sentence B-1: "The Olympics will be held in Tokyo."
Sentence B-2: "X company report says there is an economic effect of 30 trillion yen."
Sentence B-3: "In particular, the increase in environmental demand will be expected."
Sentence B-4: "Multilingual service is the major challenge for the tourism industry, for the Tokyo Olympic Games."
Sentence B-5 and subsequent sentences: " . . . (Topics or the like relating to the challenges of the tourism industry)"

Article C
Sentence C-1: "Tokyo Olympic Games will be held."
Sentence C-2: "Economic effect from the Olympics will be expected."

Article D
Sentence D-1: "The Tokyo Olympic Games will be held overcoming disadvantageous situations."
Sentence D-2: "About half a century, from the first Tokyo Olympic Games"
Sentence D-3: "Let's look back at the Tokyo Olympic Games in 1964."
Sentence D-4 and subsequent sentences: " . . . (Topics relating to the first Tokyo Olympic Games)"

In the present example, the sentence A-1 entails the sentences B-1, C-1, and D-1. Furthermore, in an entailment clustering process, it is assumed that the sentences A-1, B-1, C-1, and D-1 belong to a cluster having the sentence C-1 as the representative sentence.

When there is such a sentence set, for example, it is assumed that the user is viewing the article A and specifies the sentence A-1 therein. Furthermore, it is assumed that articles B, C, and D are specified as candidates for determining a related article.

The entailed sentence determination unit 210 of the related article determination device 200 determines whether sentences having an entailment relationship with the specified sentence are included in the specified articles. In the present example, the sentence B-1 in the article B, the sentence C-1 in the article C, and the sentence D-1 in the article D are determined to have an entailment relationship with the specified sentence A-1. Therefore, the articles B, C, and D are extracted as articles including the sentences having an entailment relationship with the specified sentence.

The difference determination unit 220 determines a difference between the extracted articles B, C, and D, and the article A including the specified sentence. For example, in the difference determination between the article A and the article B, since the article B shows not only the contents, such as "the Olympic Games is held in Tokyo" and "there is an economic effect of 30 trillion yen", but also "increase in environmental demand" and "challenge to multilingual service in the tourism industry", the article B is determined to have a difference. For example, since the article B includes at least predetermined proportions of words, such as tourism demand, tourism industry, or other language service, which are not included in the article A, the difference determination unit 220 may determine that the article B has a difference. At this time, the difference determination unit 220 may specify the sentences B-2 and B-3 in the article B including the words not included in the article A, as a difference sentence relative to the article A. Note that, in addition to a method of determining the degree of overlapping of words, the difference determination unit 220 may employ a method of determining the degree of overlapping of elements constituting an article, using information about parts of speech, such as nouns or adjectives, obtained as a result of morphological analysis.

Note that when a result of entailment determination between sentences can be obtained, the difference determination unit 220 may use the result to determine a difference between articles. For example, the difference determination unit 220 may determine the number or the proportions of sentences having no entailment relationship with any of the sentences in the article A, of the sentences in the article B, and determine that there is a difference, when the determined number or proportions are not less than a predetermined threshold.

For example, it is assumed that, as a result of the entailment determination, the article B includes the sentence B-2 having substantially the same meaning as the meaning of the sentence A-2 in the article A, but also includes the sentences B-3 and B-4 having the meanings not similar to the meaning of any of the sentences in the article A. In such a condition, the difference determination unit 220 may determine that the article B has a difference relative to the article A.

The difference determination unit 220 preferably perform difference determination between the articles A and C and between the articles A and D, as in the difference determination between the articles A and B. For example, in the difference determination between the article A and the article C, since the article C does not include a sentence having a difference relative to the sentences in the article A, the difference determination unit 220 may determine that there is no difference.

Furthermore, for example, in the difference determination between the articles A and D, for example, since the article D includes at least predetermined proportions of words such as the first Olympic Games, half a century, and 1964, which are not included in the article A, the difference determination unit 220 may determine that the article D has a difference. Furthermore, for example, as a result of the entailment determination, since the article D includes the sentences D-2 and D-3 having meanings not similar to the connotation of any of the sentences in the article A, the difference determination unit 220 may determine that the article D has a difference.

Owing to such determination, the articles B and D are specified as the related articles for sentence A-1. Furthermore, in the article B as the related article, the sentences B-2, B-3, B-4, . . . are specified as difference sentences relative to the article A. Furthermore, in the article D as the related article, the sentences D-2, D-3, . . . are specified as difference sentences relative to the article A.

Note that the example of determination of the related articles described above similarly applies to not only determination by the related article determination device 200, but also determination, for example, by the entailed sentence identification unit 110 and the difference identification unit 120 of the article management system 1. The same applies to, for example, determination by the search unit 320 and the difference determination unit 330 of the search server 302, or determination by the related article determination unit 420 of the information collection system 4.

On the basis of a result of the determination of the related article, for example, the visualization unit 130 of the article management system 1 according to the first exemplary embodiment may set links to the article B or the article D defined as the related articles, that is, defined as link destination candidate articles, or display information of the articles B or D, according to specification of an article A-1 in the article A. Furthermore, for example, when the information of the article B is displayed, the visualization unit 130 may perform emphasis display so that it can be recognized that the sentence B-1 is a sentence having a meaning similar to the sentence A-1 as a link source sentence, and that the sentence B-2, B-3, B-4, . . . are portions defined as a difference relative to the article A including the sentence A-1 as the link source sentence. For example, a similar display example includes the display by the result display unit 340 of the search server 302.

Figure 20:
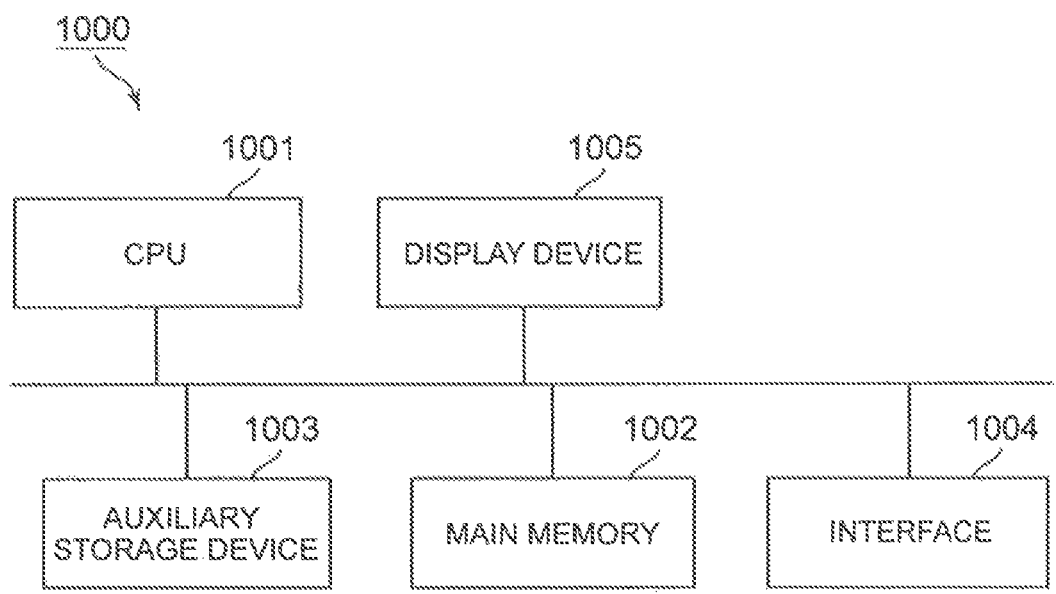
FIG. 20 It depicts a schematic block diagram illustrating a configuration example of a computer according to each of the exemplary embodiments of the present invention.

Next, a configuration example of a computer according to each of the exemplary embodiments of the present invention will be described. FIG. 20 is a schematic block diagram illustrating the configuration example of the computer according to each of the exemplary embodiments of the present invention. The computer 1000 includes a CPU 1001, a main memory 1002, an auxiliary storage device 1003, an interface 1004, and a display device 1005.

The article management system 1, the related article determination device 200, the information search system 3, and the information collection system 4 described above may be installed on the computer 1000. In such a configuration, the operation of these systems may be stored in the auxiliary storage device 1003 in the form of a program. The CPU 1001 reads a program from the auxiliary storage device 1003 and loads the program into the main memory 1002, and performs a predetermined process in each of the exemplary embodiments according to the program.

The auxiliary storage device 1003 is an example of a non-transitory tangible medium. Another example of the non-transitory tangible medium includes a magnetic disk, a magnetooptical disk, a CD-ROM, a DVD-ROM, a semiconductor memory or the like connected through the interface 1004. Furthermore, when this program is distributed to the computer 1000 through a communication line, the computer 1000 receiving the distributed program may load the program into the main memory 1002 to perform the predetermined process in each exemplary embodiment.

Furthermore, the program may partially achieve the predetermined process in each exemplary embodiment. Furthermore, the program may be a difference program combined with another program already stored in the auxiliary storage device 1003 to achieve the predetermined process in each exemplary embodiment.

Furthermore, depending on the content of a process according to an exemplary embodiment, some of elements of the computer 1000 can be omitted. For example, in the related article determination device 200 or the information collection system 4, when information is not presented to the user, the display device 1005 can be omitted. Although not illustrated in FIG. 20, depending on the content of a process according to an exemplary embodiment the computer 1000 may include an input device. For example, the article management system 1, the information search system 3, or the information collection system 4 may include an input device for inputting an instruction to move to a link, such as clicking a portion where a link is set.

In addition, some or all of the component elements of each device are implemented by a general-purpose or dedicated circuitry, a processor or the like, or a combination thereof. These may be constituted by a single chip or may be constituted by a plurality of chips connected via a bus. In addition, some or all of the component elements of each device may be achieved by a combination of the above circuitry or the like and a program.

When some or all of the component elements of each device is achieved by a plurality of information processing devices, circuitries, or the like, the plurality of information processing devices, circuitries, or the like may be arranged concentratedly or distributedly. For example, the information processing device, circuitry, or the like may be achieved in the form in which a client and server system, a cloud computing system, and the like are each connected via a communication network.

Figure 21:
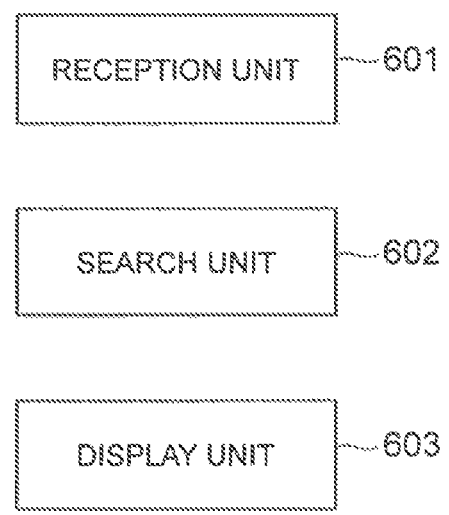
FIG. 21 It depicts a block diagram illustrating a minimum configuration of a search system according to the present invention.

Next, the outline of a search system according to the present invention will be described. FIG. 21 is a block diagram illustrating a minimum configuration of the search system according to the present invention. As illustrated in FIG. 21, the search system according to the present invention includes a reception unit 601, a search unit 602, and a display unit 603.

The reception unit 601 receives specification of a specific sentence in an article.

Note that such a reception unit 601 is described, for example, as the sentence reception unit 310 in the above exemplary embodiment.

The search unit 602 uses a first sentence being the specified sentence in the search query to search an article including a sentence having a meaning similar to the connotation of the first sentence.

Note that such a search unit 602 is described, for example, as the search unit 320 in the above exemplary embodiment.

The display unit 603 defines the searched article as a related article for the first sentence, and displays information of the related article. At this time, when there is a plurality of related articles, the display unit 603 preferentially displays the related articles in descending order of difference relative to a first article being the article including the first sentence.

Note that such a display unit 603 is described, for example, as the result display unit 340 in the above exemplary embodiment.

Furthermore, the search unit 602 may search an article including a sentence having a meaning similar to a connotation of the first sentence and having a difference relative to the first article.

Furthermore, the display unit 603 may display, as a search result, a screen on which links to each of articles defined as the related articles or processed articles obtained by processing each of the related articles are set.

The search system according to the present invention may further include a difference identification unit for comparing contents of the first article with contents of a second article being one of the searched articles, and identifying the presence or absence of a difference between the first article and the second article, or a portion in the second article having the difference relative to the contents of the first article. In such a configuration, when displaying a search result, the display unit 603 may emphasize and display the portion having the difference relative to the contents of the first article, in a distinguishable mode.

Note that such a difference identification unit is described, for example, as the difference determination unit 220 and the difference determination unit 330 in the above exemplary embodiments.

Furthermore, when displaying a search result, the display unit 603 may display a sentence having a meaning similar to any of the connotations of the first sentence, in a first mode, and display the portion regarded to have the difference relative to the contents of the first article, in a second mode.

The search system according to the present invention further includes an entailment relationship determination unit for determining the presence or absence of an entailment relationship between sentences, and when the entailment relationship determination unit determines that there is an entailment relationship between the first sentence and a second sentence being any of sentences in articles to be searched, the search unit 602 may consider each of the articles to be searched to include a sentence having a meaning similar to the connotations of the first sentence.

Note that such an entailment relationship determination unit is described, for example, as a search unit 320, in the above exemplary embodiment.

In addition, the entailment relationship determination unit may determine the presence or absence of an entailment relationship between sentences, with a relationship between two sentences in which when the meaning of one sentence is true, the meaning of the other sentence is also true, as an entailment relationship.

Furthermore, the above entailment relationship determination unit may determine the presence or absence of the entailment relationship between sentences, with a relationship between two sentences in which any of the connotations of one sentence is similar to the meaning of the other sentence, as the entailment relationship in which the other sentence entails the one sentence.

Furthermore, when the entailment relationship determination unit determines that there is an entailment relationship in which the second sentence entails the first sentence or an entailment relationship in which the first sentence entails the second sentence, the search unit 602 may consider the article to be searched to include a sentence having a meaning similar to the connotations of the first sentence.

Furthermore, when the entailment relationship determination unit determines that there is an entailment relationship in which the second sentence entails the first sentence, or an entailment relationship in which the first sentence and the second sentence entail a third sentence being a common another sentence respectively, the search unit 602 may consider the article to be searched to include a sentence having a meaning similar to the connotation of the first sentence.

In addition, the above entailment relationship determination unit may perform, on a sentence set, entailment clustering to thereby determine the presence or absence of an entailment relationship between sentences, with a relationship between the sentences belonging to the same cluster, as the entailment relationship. The entailment clustering is clustering based on a relationship between two sentences, where, when the meaning of one sentence is true, the meaning of the other sentence is also true.

The present invention has been described above with reference to the exemplary embodiments, but it should be understood that the present invention is not limited to the exemplary embodiments described above. Various changes and modifications which can be understood by a person skilled in the art may be made to the configurations and details of the present invention within the scope of the present invention.

The present application is based on and claims the benefit of priority from U.S. patent application Ser. No. 62/132,648 filed on Mar. 13, 2015, the disclosure of which is incorporated herein in its entirety by reference.

INDUSTRIAL APPLICABILITY

The present invention is suitably applicable to management of articles or collection of articles. Furthermore, the present invention is also applicable to definition of a relationship between a plurality of articles on the basis of a difference between the contents of sentences of the articles and between the contents of the articles.

REFERENCE SIGNS LIST

1 Article management system
100 Article storage unit
110 Entailed sentence identification unit
120 Difference identification unit
130 Visualization unit
200 Related article determination device
210 Entailed sentence determination unit
220 Difference determination unit
230 Result output unit
3 Information search system
301 Article providing server
302 Search server
310 Sentence reception unit
320 Search unit
330 Difference determination unit
340 Result display unit
4 Information collection system
410 Article collection unit
420 Related article determination unit
430 Related article storage unit
601 Reception unit
602 Search unit
603 Display unit
1000 Computer
1001 CPU
1002 Main memory
1003 Auxiliary storage device
1004 Interface
1005 Display device

The invention claimed is:

1. A search system comprising:
a search unit implemented at least by a hardware including a processor and using a first sentence specified by a user in an article as a search query to search an article including a sentence having a meaning similar to the connotations of the first sentence;
a display unit implemented at least by the hardware and for displaying information of the searched article as a related article to the first sentence; and
a difference identification unit implemented at least by the hardware and for comparing contents of the first article with contents of a second article being one of the searched articles, and identifying the presence or absence of a difference between the first article and the second article, or a portion in the second article having the difference relative to the contents of the first article,
wherein when there are a plurality of related articles, the display unit preferentially displays the related articles in descending order of difference relative to a first article being the article including the first sentence,
wherein the display unit displays, as a search result, a screen on which links to each of the related articles or processed articles obtained by processing each of the related articles are set, and
wherein when displaying the search result, the display unit emphasizes the portion having the difference relative to the contents of the first article, in a distinguishable mode.

2. The search system according to claim 1, wherein
the search unit searches an article including a sentence having a meaning similar to a connotation of the first sentence and having a difference relative to the first article.

3. The search system according to claim 1, wherein
when displaying a search result, the display unit displays a sentence having a meaning similar to any of the connotations of the first sentence, in a first mode, and displays the portion regarded to have the difference relative to the contents of the first article, in a second mode.

4. The search system according to claim 1, further comprising
an entailment relationship determination unit implemented at least by the hardware and for determining the presence or absence of an entailment relationship between sentences,
wherein when the entailment relationship determination unit determines that there is an entailment relationship between the first sentence and a second sentence being any of sentences in articles to be searched, the search unit may consider the article to be searched to include a sentence having a meaning similar to the connotations of the first sentence.

5. The search system according to claim 4, wherein
when the meaning of one sentence is true and the meaning of the other sentence is also true, the entailment relationship determination unit determines that there is a relationship in which the other sentence entails the one sentence.

6. The search system according to claim 5, wherein
when the entailment relationship determination unit determines that there is an entailment relationship in which the second sentence entails the first sentence or an entailment relationship in which the first sentence entails the second sentence, the search unit considers the article to be searched to include a sentence having a meaning similar to the connotations of the first sentence.

7. The search system according to claim 5, wherein when the entailment relationship determination unit determines that there is an entailment relationship in which the second sentence entails the first sentence, or an entailment relationship in which the first sentence and the second sentence entail a third sentence being a common another sentence respectively, the search unit considers the article to be searched to include a sentence having a meaning similar to the connotation of the first sentence.

8. A search method comprising:

using a first sentence specified by a user in an article as a search query to search an article including a sentence having a meaning similar to the connotations of the first sentence;

displaying information of the searched article as a related article to the first sentence; and comparing contents of the first article with contents of a second article being one of the searched articles, and identifying the presence or absence of a difference between the first article and the second article, or a portion in the second article having the difference relative to the contents of the first article, wherein when there are a plurality of related articles, the related articles are preferentially displayed in descending order of difference relative to a first article being the article including the first sentence, for display, wherein a screen, on which links to each of the related articles or processed articles obtained by processing each of the related articles are set, are displayed as a search result, and wherein when displaying the search result, the portion having the difference relative to the contents of the first article are emphasized in a distinguishable mode.

9. A non-transitory computer readable recording medium in which a search program is recorded, the search program causing a computer to execute a process, comprising:

using a first sentence specified by a user in an article as a search query to search an article including a sentence having a meaning similar to the connotations of the first sentence;

displaying information of the searched article as a related article to the first sentence; and comparing contents of the first article with contents of a second article being one of the searched articles, and identifying the presence or absence of a difference between the first article and the second article, or a portion in the second article having the difference relative to the contents of the first article, wherein in the process of displaying, when there are a plurality of related articles, the related articles are preferentially displayed in descending order of difference relative to a first article being the article including the first sentence, wherein a screen, on which links to each of the related articles or processed articles obtained by processing each of the related articles are set, are displayed as a search result, and wherein when displaying the search result, the portion having the difference relative to the contents of the first article are emphasized in a distinguishable mode.

* * * * *